(12) United States Patent
Leyrer et al.

(10) Patent No.: US 10,920,001 B2
(45) Date of Patent: *Feb. 16, 2021

(54) PROCESS FOR OBTAINING A CATIONIC POLYMER WITH AN AT LEAST BIMODAL MOLECULAR WEIGHT DISTRIBUTION

(71) Applicant: BASF SE, Ludwigshafen am Rhein (DE)

(72) Inventors: Reinhold J. Leyrer, Dannstadt-Schauernheim (DE); Gledison Fonseca, Ludwigshafen (DE); Aaron Flores-Figueroa, Ludwigshafen (DE); Volodymyr Boyko, Ludwigshafen (DE); Robert Richard Dykstra, Cincinnati, OH (US); Mark Robert Sivik, Cincinnati, OH (US)

(73) Assignee: BASF SE, Ludwigshafen am Rhein (DE)

( * ) Notice: Subject to any disclaimer, the term of this patent is extended or adjusted under 35 U.S.C. 154(b) by 86 days.

This patent is subject to a terminal disclaimer.

(21) Appl. No.: 16/072,552

(22) PCT Filed: Jan. 16, 2017

(86) PCT No.: PCT/EP2017/050829
§ 371 (c)(1),
(2) Date: Jul. 25, 2018

(87) PCT Pub. No.: WO2017/129435
PCT Pub. Date: Aug. 3, 2017

(65) Prior Publication Data
US 2019/0062478 A1  Feb. 28, 2019

(30) Foreign Application Priority Data
Jan. 25, 2016  (EP) .................................... 16152590

(51) Int. Cl.
| C08F 226/02 | (2006.01) |
| C08F 226/06 | (2006.01) |
| C08F 220/34 | (2006.01) |
| C08F 2/22 | (2006.01) |
| C08F 220/56 | (2006.01) |
| C08F 226/10 | (2006.01) |
| C08F 226/08 | (2006.01) |
| C08F 226/12 | (2006.01) |

(52) U.S. Cl.
CPC .............. *C08F 220/34* (2013.01); *C08F 2/22* (2013.01); *C08F 220/56* (2013.01); *C08F 226/06* (2013.01); *C08F 226/10* (2013.01); *C08F 226/02* (2013.01); *C08F 226/08* (2013.01); *C08F 226/12* (2013.01); *C08F 2500/05* (2013.01); *C08F 2810/20* (2013.01)

(58) Field of Classification Search
None
See application file for complete search history.

(56) References Cited

U.S. PATENT DOCUMENTS

| 2004/0115149 A1 | 6/2004 | Loffler et al. |
| 2008/0312343 A1 | 12/2008 | Braun et al. |
| 2015/0275135 A1 | 10/2015 | Si et al. |
| 2015/0275136 A1 | 10/2015 | Si et al. |
| 2016/0024426 A1 | 1/2016 | Sivik et al. |
| 2016/0024427 A1 | 1/2016 | Sivik et al. |
| 2016/0024428 A1 | 1/2016 | Dykstra et al. |
| 2016/0024433 A1 | 1/2016 | Sivik et al. |
| 2016/0060570 A1 | 3/2016 | Panandiker et al. |
| 2016/0060571 A1 | 3/2016 | Panandiker et al. |
| 2016/0060575 A1 | 3/2016 | Panandiker et al. |
| 2016/0237381 A1 | 8/2016 | Chen et al. |
| 2017/0037336 A1 | 2/2017 | Mezger et al. |
| 2017/0166844 A1 | 6/2017 | Panandiker et al. |
| 2017/0171002 A1 | 6/2017 | Palmer |
| 2017/0204212 A1 | 7/2017 | Leyrer et al. |
| 2017/0211018 A1 | 7/2017 | Dykstra et al. |
| 2017/0247637 A1 | 8/2017 | Dykstra et al. |
| 2017/0298295 A1 | 10/2017 | Dykstra et al. |
| 2017/0342345 A1 | 11/2017 | Sivik et al. |
| 2017/0369602 A1 | 12/2017 | Leyrer et al. |

FOREIGN PATENT DOCUMENTS

| WO | 02057400 A2 | 7/2002 |
| WO | 03102043 A1 | 12/2003 |
| WO | 2004050815 A1 | 6/2004 |
| WO | 2010078959 A1 | 7/2010 |
| WO | 2010079100 A1 | 7/2010 |
| WO | 2013068387 A1 | 5/2013 |
| WO | 2013068394 A1 | 5/2013 |
| WO | 2013174622 A1 | 11/2013 |
| WO | 2015143997 A1 | 10/2015 |
| WO | 2016074142 A1 | 5/2016 |
| WO | 2016127387 A1 | 8/2016 |
| WO | 2017129435 A1 | 8/2017 |

OTHER PUBLICATIONS

International Search Report and Written Opinion for International Application No. PCT/EP2017/050829 dated Mar. 22, 2017, 9 pages.

*Primary Examiner* — Richard A Huhn
(74) *Attorney, Agent, or Firm* — Armstrong Teasdale LLP

(57) ABSTRACT

The present invention relates to a process for obtaining a cationic polymer by polymerization of at least one cationic monomer, at least one crosslinker and optionally further monomers, such as nonionic monomers, associative monomers and/or chain transfer agents. The cationic polymer has an at least bimodal molecular weight distribution with at least one first peak (P1) and at least one second peak (P2), wherein the first peak has a lower average sedimentation coefficient of ≤100 Sved and the second peak has a higher average sedimentation coefficient of ≥1000 Sved. The polymerization is carried out in two subsequent steps I) and II). In step II), the crosslinker is either completely absent or present in a very limited amount. Step II) is carried out after the polymerization of step I is finished or vice versa.

20 Claims, 2 Drawing Sheets

PROCESS FOR OBTAINING A CATIONIC POLYMER WITH AN AT LEAST BIMODAL MOLECULAR WEIGHT DISTRIBUTION

CROSS-REFERENCE TO RELATED APPLICATIONS

This application is a U.S. National Phase Application of PCT/EP2017/050829, filed Jan. 16, 2017, which claims the benefit of priority to EP Application No. 16152590.2, filed Jan. 25, 2016, the contents of which are hereby expressly incorporated by reference in their entirety.

BACKGROUND

The present invention relates to a process for obtaining a cationic polymer by polymerization of at least one cationic monomer, at least one crosslinker and optionally further monomers, such as nonionic monomers, associative monomers and/or chain transfer agents. The cationic polymer has an at least bimodal molecular weight distribution with at least one first peak (P1) and at least one second peak (P2), wherein the first peak has a lower average sedimentation coefficient of ≤100 Sved and the second peak has a higher average sedimentation coefficient of ≥1000 Sved. The polymerization is carried out in two subsequent steps I) and II). In step II), the crosslinker is either completely absent or present in a very limited amount. Step II) is carried out after the polymerization of step 1) is finished or vice versa.

WO 03/102043 describes an aqueous formulation comprising a cationic polymer having: a) a water soluble ethylenically unsaturated monomer or blend of monomers comprising at least one cationic monomer; b) at least one cross-linking agent in an amount of more than 50 ppm by the weight of component a); c) and at least one chain transfer agent. The aqueous formulations can be used as thickeners in home care formulations.

WO 2010/078959 relates to cationic polymer thickeners consisting of a crosslinked water-swellable cationic polymer comprising at least one cationic monomer and optionally nonionic or anionic monomers, said polymer comprising less than 25% of water-soluble polymer chains, based on the total weight of the polymer. The polymer also comprises a crosslinker in a concentration of 500 to 5000 ppm relative to the polymer. The cationic polymer is prepared by inverse emulsion polymerization.

WO 2010/079100 discloses fabric softener compositions comprising polymers according to WO 2010/078959.

US 2008/0312343 reads on inverse latex compositions and on the use thereof as a thickener and/or emulsifier, for example for production of cosmetic or pharmaceutical formulations. The inverse latex compositions comprise at least 50 to 80% by weight of at least one linear, branched or crosslinked organic polymer (P), at least 5 to 10% by weight of a water-in-oil-type emulsifier system, 5 to 45% by weight of at least one oil and up to 5% water. The polymer P comprises uncharged monomers and optionally cationic or anionic monomers. The inverse latex composition may optionally comprise up to 5% by weight of an oil-in-water-type emulsifier system. The inverse latex compositions can be prepared by inverse emulsion polymerization.

WO 02/057400 relates to thickened fabric conditioners, which fabric conditioners contain a particular polymeric thickener, which is obtained by polymerizing from 5 to 100 mole percent of a cationic vinyl addition monomer, from 0 to 95 mole percent of acrylamide, and from 70 to 300 ppm of a difunctional vinyl addition monomer cross-linking agent. As compared to such compositions comprising a similar product but obtained from a polymerization reaction using between 5 and 45 ppm cross-linking agent, considerable advantages are obtained. Especially, the delivery of fragrance present in the softening composition is more efficiently carried over to the fabrics to be treated.

WO 2013/068394 relates to a thickener comprising at least one cationic polymer and at least one activator, wherein the ratio of activator to cationic polymer is >10:100 [% by weight/% by weight]. The cationic polymer is preparable by polymerization of at least one water-soluble, ethylenically unsaturated monomer and at least one ethylenically unsaturated associative monomer. WO 2013/068394 further relates to a process for preparing the inventive thickener and to surfactant-containing formulations comprising at least one thickener. WO 2013/068394 further provides for the use of the surfactant-containing formulations, for example as a softener or as a liquid washing composition, and to the use of the thickener, for example as a viscosity modifier.

WO 2013/068387 relates to a thickener preparable by a process in which a cationic polymer is prepared by inverse emulsion polymerization at a constant temperature of at least 40° C. The components used in the inverse emulsion polymerization are at least one water-soluble, ethylenically unsaturated monomer comprising at least one cationic monomer, and at least one ethylenically unsaturated associative monomer. WO 2013/068387 further relates to a process for preparing the inventive thickener and to surfactant-containing formulations comprising at least one thickener. WO 2013/068387 further provides for the use of the surfactant-containing formulations, for example as a softener or as a liquid washing composition, and to the use of the thickener, for example as a viscosity modifier.

WO 2013/174622 relates to an inverse dispersion comprising i) at least one cationic polymer obtainable by the polymerization of a) at least one cationic monomer and optionally at least one nonionic monomer (compound A), b) optionally at least one crosslinker (compound B), c) optionally at least one chain transfer agent (compound C), ii) at least one stabilizing agent, wherein the stabilizing agent has one or more hydrophobic chains with more than 30 carbon atoms, iii) at least one non-aqueous carrier.

DESCRIPTION

Figure 1:
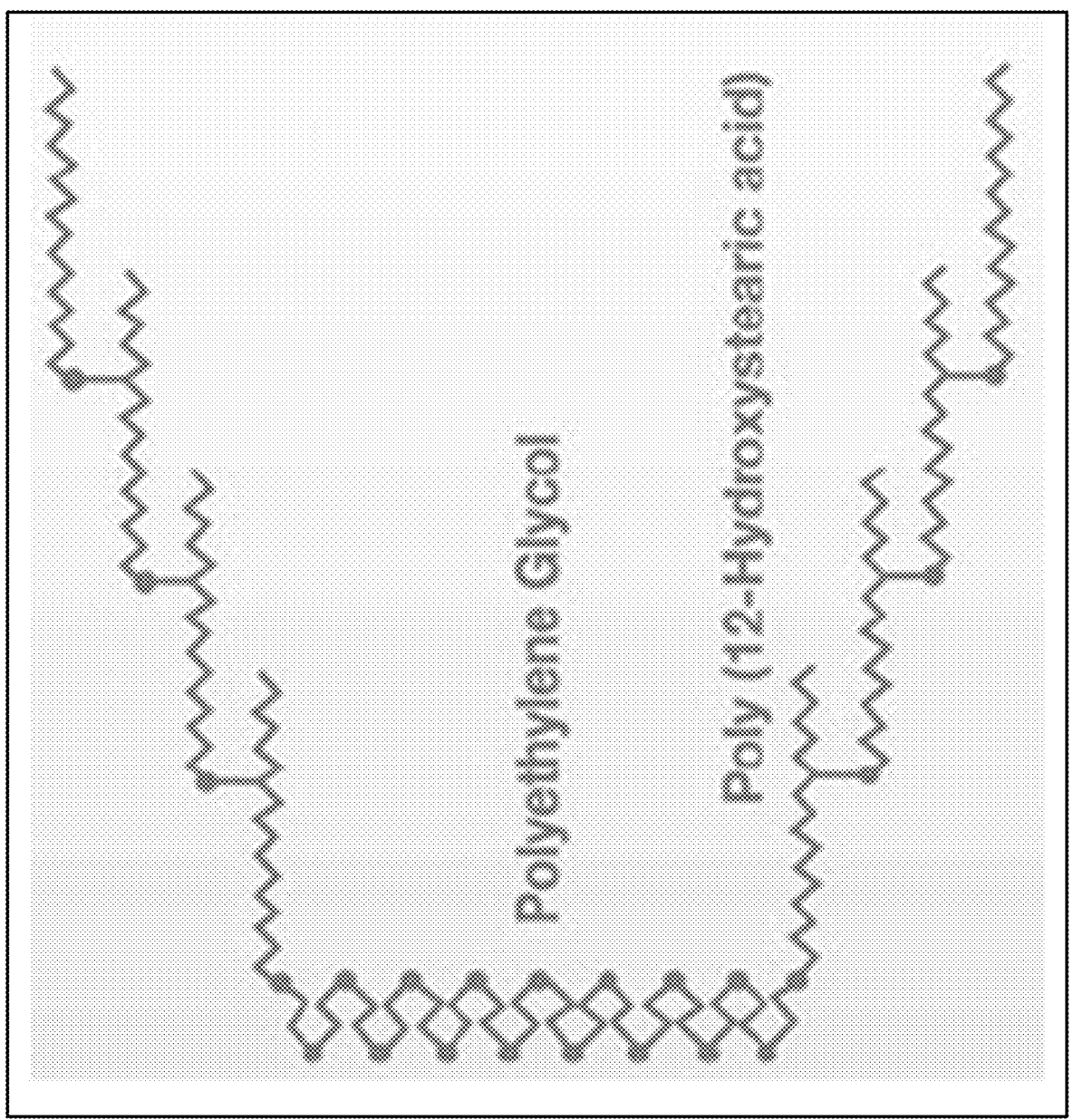
FIG. 1 is an exemplary embodiment of a nonionic ABA-block copolymer stabilizing agent B in accordance with the present disclosure.

There is a steady demand in the market for new and/or cheaper and/or more effective home and personal care formulations and/or the respective polymers contained therein as well as the provision of novel processes for preparing such polymers.

The problem underlying the present invention consists in the provision of a process for preparing novel cationic polymers and/or inverse dispersions, containing at least one of such cationic polymers.

The object is achieved by a process for obtaining a cationic polymer by polymerization of a) at least one cationic monomer and optionally at least one nonionic monomer (monomer component a), b) at least one crosslinker (monomer component b),
c) optionally at least one chain transfer agent (monomer component c),
   wherein the cationic polymer has an at least bimodal molecular weight distribution with at least one first peak (P1) with an average sedimentation coefficient of ≤100 Sved and with at least one second peak (P2) with an average sedimentation coefficient of ≥1000 Sved, and
   wherein the polymerization is carried out in two subsequent steps I) and II) with:
   I) polymerization of monomer component a) and monomer component b),
   II) polymerization of monomer component a), optionally monomer component c) and in the complete absence or in the presence of <10 ppm (related to the total amount of polymer) of monomer component b),
   wherein step II) is carried out after the polymerization of step 1) is finished or step I) is carried out after the polymerization of step II) is finished.

An advantage of the inventive process is that cationic polymers significantly differing in their molecular weight and additionally having an at least bimodal molecular weight distribution can be produced in a single process. Preferably, only one polymerization vessel needs to be employed since the two polymerization steps I) and II) are carried out subsequently. This advantage becomes more evident in case the inventive process is carried out in a preferred embodiment as an emulsion polymerization, more preferably as an inverse emulsion polymerization. This is due to the fact that no coagulum or only a rather small amount of coagulum is produced by the inventive process since the two polymerization steps are carried out subsequently.

This advantage becomes even more evident in connection with those embodiments, wherein an inverse dispersion is prepared/employed containing such cationic polymers obtained by the inventive process or the cationic polymer is prepared within an inverse dispersion, respectively. It has to be noted that dispersions are always shear-sensitive. Due to their shear-sensitivity, (inverse) dispersions tend to easily form coagulum. If, for example, cationic polymers having a wide range of molecular weight have to be produced by a skilled person according to the methods of the prior art, the individual polymer components differing in respect of their molecular weight are usually produced independently from each other and mixed afterwards. However, the handling of such differing polymer mixtures, differing in respect of their molecular weight, is rather difficult, especially if the respective polymers are contained within an inverse dispersion, due to the formation of rather high amounts of coagulum when mixing the individual polymers or inverse dispersions, respectively.

The cationic polymers obtained by the process according to the present invention possess advantageous properties when they are employed, for example, within inverse dispersions, thickeners, deposition aids and/or (aqueous) home and personal care formulations. The cationic polymers contribute to an improved stability and effectiveness of the respective product, such as an aqueous formulation containing the respective cationic polymer, the respective inverse dispersion or the respective deposition aids. Likewise, the cationic polymers according to the present invention can be successfully employed as depositioning aids in liquid laundry formulations, especially in fabric softeners, i.e. to improve the depositioning of softening or freshness active ingredients such as quaternized compounds, silicone or fragrance on the textile fibres.

Another advantage of the cationic polymers obtained by the process according to the present invention is that they contain both polymer components with a lower molecular weight (having an average sedimentation coefficient of ≤100 Sved) and polymer components with a higher molecular weight (having an average sedimentation coefficient of ≥1000 Sved). The cationic polymers obtained by the process according to the present invention contain both types of said polymer components in a significant amount. The amount of water-soluble polymer components may vary in a very wide range, for example, at least 25% by weight of the respective polymer components are water-soluble, i.e. the polymer components with a rather low molecular weight. Those water-soluble polymer components are not cross-linked at all or only cross-linked to a very limited amount. By contrast, the respective polymer components of the cationic polymer obtained by the process according to the present invention having a rather high molecular weight contain a rather high amount of cross-linking. Said polymer components with a rather high molecular weight are nearly or completely insoluble in water and only more or less swellable in water. Furthermore, only a rather limited amount of crosslinker has to be employed for producing the cationic polymers obtained by the process according to the present invention.

When assessing the shear dilution, it is important that an inverse dispersion containing the cationic polymers obtained by the process according to the present invention, after being added to the aqueous formulation like a fabric softener, where the phase inversion from a water in oil to an oil in water system is taking place, in its basic state is viscous and thick whereas it is thin upon stirring. The improved shear dilution has a positive effect on the life and properties of pumps during the production of the aqueous fabric softener, promotes convenient dosage for the consumer and promotes the residue-free use of the fabric softener, especially in the washing machines which have an automatic dosing device. The inverse dispersions containing the cationic polymers obtained by the process according to the invention improve the stability of the corresponding formulation. Also in the aqueous formulation containing the inventive cationic polymer after phase inversion the settling or creaming of additionally added particles like vesicles, different soap phases, microcapsules, silicon particles, aluminium flakes or other particles is effectively prevented, irrespective of whether they are within the order of magnitude of nanometers, micrometers or millimeters. Moreover, they have the advantages that any redispersion required as well as the thickening effect are achieved very quickly.

Embodiments of the process according to the present invention in which the cationic polymers present in the inverse dispersion are prepared using little amount of crosslinker is likewise associated with advantages.

Due to the relatively high amount of water-soluble polymer components of the cationic polymer, resoiling during a washing operation is reduced. Consequently, the article to be washed, even after repeated washing operations, has clean fibers which have been free effectively of soil particles, such that graying has been minimized. Only very slight, if any, adhesion or redistribution of soil particles/polymers on the washed articles is observed, which can then be removed in the next washing cycle avoiding an accumulation effect. Also in that phase of the process, it is advantageous to employ the cationic polymers together with a stabilizing agent containing one or more hydrophobic chains with more than 30 carbon atoms in order to apparently supporting the stabilization of the dispersed solid particles, especially by employing those stabilizing agents with longer hydrophilic B blocks.

A further advantage of the cationic polymers or inverse dispersions, respectively, prepared by the inventive process is manifested in surfactant-containing formulations because a high thickening performance and/or marked shear dilution are achieved in these formulations even at low thickener concentrations (<1% by weight of inverse dispersion related to the total weight of the formulation).

A further advantage of the cationic polymers or inverse dispersions, respectively, prepared by the inventive process is manifested in fabric softeners having the above-mentioned advantages in the rheology. But the additional advantage is the high storage stability of aqueous fabric softeners formulations if they contain the inventive cationic polymer. Furthermore the effectiveness of such fabric softeners is highly improved as the inventive cationic polymers induce the more quantitative deposition of the softening components and the fragrance on the laundry during the last processing step in the washing machine.

Within the context of the present invention, the term "cationic polymer" means the entirety of all polymer components of the respective cationic polymer. The polymer components may also be designated as individual polymer components, individual polymers, polymer molecules or individual polymer molecules. The (individual) polymer components differ in respect of their (individual) molecular weight. The molecular weight of an (individual) polymer component may be influenced, for example, by the amount of crosslinker employed within the respective polymerization process. By consequence, each polymer (known in the state of the art) has a molecular weight distribution since it contains a plurality of polymer components/individual polymer molecules. However, the cationic polymers according to the present invention have an at least bimodal molecular weight distribution (as further specified within the context of the present invention).

In the context of the present invention, the term "at least bimodal molecular weight distribution" means that the molecular weight distribution within the cationic polymer according to the present invention may be bimodal, trimodal, tetramodal or pentamodal, or it may contain an even higher modality. The modality of the molecular weight distribution of the cationic polymers according to the present invention is determined by the number of (main) peaks. Unless indicated otherwise, the peaks are determined/measured by an average sedimentation coefficient. Only those peaks are considered for determination of the respective modality, which contribute to an amount of more than 1%, preferably of more than 5%, to the total amount of polymer (main peaks). In other words, rather small peaks in the baseline having a very low signal to noise ratio are not considered as a peak when determining the modality of the respective polymer. In case a peak, such as the first peak (P1) is splitted into two or more peaks (P1.1, P1.2, ... P1.X), said peaks (P1.1, P1.2, ... P1.X) may overlap. For example, if the first peak (P1) is splitted into the two peaks P1.1 and P1.2, but there is only one second peak (P2), the respective cationic polymer is trimodal in respect of the peaks (P1) and (P2) and bimodal in respect of peak (P1). The determination of the modality and the average sedimentation coefficient in the unit of Svedberg (Sved) is carried out according to P. Schuck, 'Size-distribution analysis of macromolecules by sedimentation velocity ultracentrifugation and Lamm equation modeling', Biophysical Journal 78, (3) (2000), 1606-1619.

In the context of the present invention, the definitions such as $C_1$-$C_{30}$-alkyl, as defined, for example, below for the $R_4$ radical in formula (II), mean that this substituent (radical) is an alkyl radical having a carbon atom number from 1 to 30. The alkyl radical may be either linear or branched and optionally cyclic. Alkyl radicals which have both a cyclic and a linear component are likewise covered by this definition. The same also applies to other alkyl radicals, for example a $C_1$-$C_4$-alkyl radical or a $C_{16}$-$C_{22}$-alkyl radical. The alkyl radicals may optionally also be mono- or polysubstituted by functional groups such as amino, quaternary ammonium, hydroxyl, halogen, aryl or heteroaryl. Unless stated otherwise, the alkyl radicals preferably do not have any functional groups as substituents. Examples of alkyl radicals are methyl, ethyl, n-propyl, isopropyl, n-butyl, isobutyl, 2-ethylhexyl, tert-butyl (tert-Bu/t-Bu), cyclohexyl, octyl, stearyl or behenyl.

The present invention is specified further hereinafter:

Within the inventive process, the cationic polymer is obtained by polymerization of the following monomer components a) and b) and optionally c) and d).

The monomer component a) used is at least cationic monomer and optionally at least one nonionic monomer. Cationic monomers as such and nonionic monomers as such are known to persons skilled in the art.

The cationic monomer according to monomer component a) is preferably selected from a compound of the formula (II)

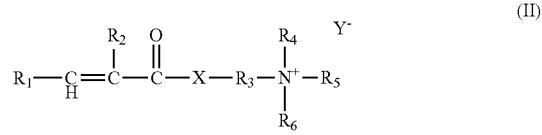

where
$R_1$ is H or $C_1$-$C_4$-alkyl,
$R_2$ is H or methyl,
$R_3$ is $C_1$-$C_4$-alkylene,
$R_4$, $R_5$ and $R_6$ are each independently H or $C_1$-$C_{30}$-alkyl,
X is —O— or —NH— and
Y is Cl; Br; I; hydrogensulfate or methosulfate.

Particularly preferred cationic monomers are [2-(acryloyloxy)ethyl]trimethylammonium chloride or trimethyl-[2-(2-methylprop-2-enoyloxy)ethyl]azanium chloride.

In one embodiment of the present invention, it is preferred that, in the cationic monomer of the formula (II),
i) $R_1$ and $R_2$ are each H or
ii) $R_1$ is H and $R_2$ is $CH_3$.

Monomer component a) may optionally comprise at least one nonionic monomer. Apart from the nitrogen-containing monomers described below, for example the compounds of the formula (III), esters of anionic monomers are also suitable as nonionic monomers.

Such nonionic monomers are preferably the methyl or ethyl esters of acrylic acid or methacrylic acid, such as ethyl acrylate or methyl acrylate. Additionally preferred are the corresponding dimethylamino-substituted esters such as dimethylaminoethyl (meth)acrylate.

Preferably, the nonionic monomer according to monomer component a) in the cationic polymer is selected from N-vinylpyrrolidone, N-vinylimidazole or a compound of the formula (III)

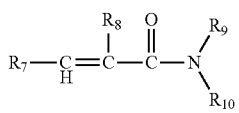

(III)

where
$R_7$ is H or $C_1$-$C_4$-alkyl,
$R_8$ is H or methyl, and
$R_9$ and $R_{10}$ are each independently H or $C_1$-$C_{30}$-alkyl.

The nonionic monomer is more preferably acrylamide, methacrylamide or dialkylaminoacrylamide, most preferably acrylamide. When component a) comprises at least one nonionic monomer, it is preferably present to an extent of 0.5 to 70% by weight.

In one embodiment of the present invention the cationic monomer according to monomer component a) in the cationic polymer is selected from a compound of the formula (II)

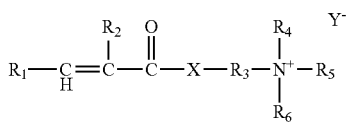

(II)

where
$R_1$ is H or $C_1$-$C_4$-alkyl,
$R_2$ is H or methyl,
$R_3$ is $C_1$-$C_4$-alkylene,
$R_4$, $R_5$ and $R_6$ are each independently H or $C_1$-$C_{30}$-alkyl,
X is —O— or —NH— and
Y is Cl; Br; I; hydrogensulfate or methosulfate and
wherein monomer component a) in the cationic polymer comprises 30 to 100% by weight, preferably 60 to 100% by weight, of at least one cationic monomer and 0.5 to 70% by weight, preferably 0 to 40% by weight, of at least one nonionic monomer, preferably, the polymerization is carried out as an emulsion polymerization, even more preferably as an inverse emulsion polymerization.

In one embodiment of the present invention, the monomer component a) contains at least one cationic monomer and at least one nonionic monomer.

In a preferred embodiment of the present invention, monomer component a) in the cationic polymer comprises 30 to 99.5% by weight, preferably 60 to 90% by weight, of at least one cationic monomer and 0.5 to 70% by weight, preferably 10 to 40% by weight, of at least one nonionic monomer.

In a further preferred embodiment of the present invention, monomer component a) comprises 100% by weight of at least one cationic monomer.

The monomer component b) used is at least one crosslinker. Suitable crosslinkers are known to those skilled in the art.

Preferably, the crosslinker in the cationic polymer is selected from divinylbenzene; tetraallylammonium chloride; allyl acrylates; allyl methacrylates; diacrylates and dimethacrylates of glycols or polyglycols; butadiene; 1,7-octadiene; allylacrylamides or allylmethacrylamides; bisacrylamidoacetic acid; N,N'-methylenebisacrylamide; polyol polyallyl ethers such as polyallyl sucrose or pentaerythritol triallyl ether; pentaerythrityl triacrylate; pentaerythrityl tetraacrylate; 1,1,1-trimethylolpropane tri(meth)acrylate; the ethoxylated compounds thereof or a mixture thereof.

Most preferably the crosslinker is selected from N,N'-methylenebisacrylamide, pentaerythrityl triacrylate or pentaerythrityl tetraacrylate.

In one embodiment according to the present invention, the crosslinker in the cationic polymer is a trifunctional monomer, a tretrafunctional monomer or a mixture thereof. Preferably, the crosslinker of this embodiment is selected from tetraallylammonium chloride; allyl acrylates; allyl methacrylates; and tri- and tetramethacrylates of polyglycols; or polyol polyallyl ethers such as polyallyl sucrose or pentaerythritol triallyl ether, ditrimethylolpropane tetraacrylate, pentaerythrityl tetraacrylate, pentaerythrityl tetramethacrylate, pentaerythrityl triacrylate, pentaerythrityl triacrylate, ethoxylated, triethanolamine trimethacrylate, 1,1,1-trimethylolpropane triacrylate, 1,1,1-trimethylolpropane triacrylate, ethoxylated, trimethylolpropane tris(polyethylene glycol ether) triacrylate, 1,1,1-trimethylolpropane trimethacrylate, tris-(2-hydroxyethyl)-1,3,5-triazine-2,4,6-trione triacrylate, tris-(2-hydroxyethyl)-1,3,5-triazine-2,4,6-trione trimethacrylate, dipentaerythrityl pentaacrylate, 3-(3-{[dimethyl-(vinyl)-silyl]-oxy}-1,1,5,5-tetramethyl-1,5-divinyl-3-trisiloxanyl)-propyl methacrylate, dipentaerythritol hexaacrylate, 1-(2-propenyloxy)-2,2-bis[(2-propenyloxy)-methyl]-butane, trimethacrylic acid-1,3,5-triazin-2,4,6-triyl-tri-2,1-ethandiyl ester, glycerine triacrylate, propoxylated, 1,3,5-triacryloylhexahydro-1,3,5-triazine, 1,3-dimethyl-1,1,3,3-tetravinyldisiloxane, pentaerythrityl tetravinyl ether, 1,3-dimethyl-1,1,3,3-tetravinyldisiloxane, (ethoxy)-trivinylsilane, (Methyl)-trivinylsilane, 1,1,3,5,5-pentamethyl-1,3,5-trivinyltrisiloxane, 1,3,5-trimethyl-1,3,5-trivinylcyclotrisilazane, 2,4,6-trimethyl-2,4,6-trivinylcyclotrisiloxane, 1,3,5-trimethyl-1,3,5-trivinyltrisilazane, tris-(2-butanone oxime)-vinylsilane, 1,2,4-trivinylcyclohexane, trivinylphosphine, trivinylsilane, methyltriallylsilane, pentaerythrityl triallyl ether, phenyltriallylsilane, triallylamine, triallyl citrate, triallyl phosphate, triallylphosphine, triallyl phosphite, triallylsilane, 1,3,5-triallyl-1,3,5-triazine-2,4,6(1H,3H,5H)-trione, trimellitic acid triallyl ester, trimethallyl isocyanurate, 2,4,6-tris-(allyloxy)-1,3,5-triazine, 1,2-Bis-(diallylamino)-ethane, pentaerythrityl tetratallate, 1,3,5,7-tetravinyl-1,3,5,7-tetramethylcyclotetrasiloxane, 1,3,5,7-tetravinyl-1,3,5,7-tetramethylcyclotetrasiloxane, tris-[(2-acryloyloxy)-ethyl]-phosphate, vinylboronic anhydride pyridine, 2,4,6-trivinylcyclotriboroxanepyridine, tetraallylsilane, tetraallyloxysilane, 1,3,5,7-tetramethyl-1,3,5,7-tetravinylcyclotetrasilazane. More preferably, the crosslinker of this embodiment is selected alkyltrimethylammonium chloride, pentaerythrityl triacrylate, pentaerythrityl tetraacrylate, tetrallylammonium chloride, 1,1,1-trimethylolpropane tri(meth)acrylate, or a mixture thereof. These more preferred compounds can also be ethoxylated.

It is generally preferred within the present invention that the crosslinker contains more than two reactive groups and/or is used in an amount of 10 to 500 ppm, preferably 30 to 490 ppm, more preferably 50 to 400 ppm, even more preferably less than 375 ppm, related to the total amount of cationic polymer.

In the preparation of the cationic polymer by polymerization, at least one chain transfer agent may optionally be present as monomer component c). Suitable chain transfer agents are known to those skilled in the art. Preferably, the chain transfer agent in the cationic polymer is selected from mercaptans, lactic acid, formic acid, isopropanol or hypophosphites. More preferably, the chain transfer agent is formic acid or sodium hypophosphite. It is furthermore preferred that at least one chain transfer agent is employed within the polymerization for obtaining the cationic polymer.

Furthermore, it is additionally possible, in the preparation of the cationic polymer by polymerization, to use at least one associative monomer as monomer component d).

Associative monomers as such are known to those skilled in the art. Suitable associative monomers are described, for example, in WO 2009/019225. Associative monomers are also described as surfactant monomers.

Preferably, the associative monomer according to monomer component d) in the cationic polymer is selected from a compound of the formula (I)

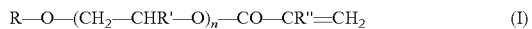

where
R is $C_6$-$C_{50}$-alkyl, preferably $C_8$-$C_{30}$-alkyl, especially $C_{16}$-$C_{22}$-alkyl,
R' is H or $C_1$-$C_4$-alkyl, preferably H,
R" is H or methyl,
n is an integer from 0 to 100, preferably 3 to 50, especially 25.

More preferably, monomer component d) used is a compound of the formula (I) in which
R is $C_{16}$-$C_{22}$-alkyl,
R' is H,
R" is H or methyl and
n is 25.

Compounds of the formula (I) are commercially available in solution, for example under the Plex 6954 O name from Evonik Röhm GmbH. These are methacrylates of fatty alcohol ethoxylates. A suitable fatty alcohol ethoxylate is, for example, the commercially available Lutensol® AT 25 (BASF SE, Ludwigshafen, Germany).

The R radical in the compounds of the formula (I) may also be present as a mixture of radicals with different chain lengths, such as $C_{16}$ and $C_{18}$. One example thereof is $C_{16}$-$C_{18}$-fatty alcohol-(ethylene glycol)$_{25}$-ether methacrylate, where both $C_{16}$ and $C_{18}$ fatty alcohol radicals (in non-negligible amounts) are present as a mixture. In contrast, for example, in the compounds (of the formula (I)) behenyl-25 methacrylate and cetyl-25 methacrylate, the particular R radical is not present as a mixture but as a $C_{22}$ or $C_{16}$ chain. Other chain lengths occur only in the form of impurities. The number "25" in these compounds of the formula (I) represents the size of the variables n.

In one preferred embodiment according to the present invention, the inventive process for obtaining the cationic polymer is carried out by polymerization of the monomer components a), b), c) and optionally d) as defined above.

In another embodiment according to the present invention, the inventive process for obtaining the cationic polymer is carried out by polymerization of the monomer components a), b), c) and d) as defined above.

Within all embodiments according to the present invention, the inventive process for obtaining the cationic polymer may be carried out by additional polymerization of further monomer components which do not fall under the definition of the monomer components a), b), c) and d) as defined above. However, it is preferred that no further monomer components, which do not fall under the definition of the monomer components a), b), c) and d) as defined above, are employed within the inventive polymerization process for obtaining the cationic polymer.

The cationic polymer has an at least bimodal molecular weight distribution with at least one first peak (P1) with an average sedimentation coefficient of ≤100 Sved and with at least one second peak (P2) with an average sedimentation coefficient of ≥1000 Sved.

In respect of the at least bimodal molecular weight distribution (as defined above) of the cationic polymer according to the present invention, it is preferred that the first peak (P1) is splitted into at least two peaks (P1.1, P1.2, . . . P1.X) and the weight average sum of said peaks (P1.1, P1.2, . . . P1.X) has a sedimentation coefficient of ≤50 Sved, more preferably ≤10 Sved, even more preferably ≤6 Sved, most preferably ≤4 Sved.

Alternatively, in case the first peak (P1) is not splitted into more than one peak, the first peak (P1) has an average sedimentation coefficient of ≤50 Sved, more preferably ≤10 Sved, even more preferably ≤5 Sved, much more preferably ≤6 Sved, most preferably ≤4 Sved.

It is also preferred that the second peak (P2) has an average sedimentation coefficient of ≥10.000 Sved, more preferably 14.000 Sved, even more preferably ≥30.000 Sved, most preferably ≥50.000 Sved. Analogously to the above disclosed connection with the first peak (P1), the second peak (P2) may also be splitted into at least two peaks (P2.1, P2.2, . . . P2.X).

Furthermore, it is preferred that the cationic polymer has an at least trimodal molecular weight distribution, in particular a trimodal or tetramodal molecular weight distribution.

It is even further preferred that the cationic polymer as defined above, wherein the first peak (P1) is splitted into at least two peaks (P1.1, P1.2, . . . P.X), preferably is splitted into two or three peaks (P1.1, P1.2, P1.3), wherein
i) preferably, the lower molecular weight peak (P1.1) has a weight average peak maximum of ≤1.000.000 g/mol, preferably ≤500.000 g/mol, most preferably ≤100.000 g/mol, and the higher molecular weight peak (P1.2) has a weight average peak maximum of ≥1.000.000 g/mol, preferably ≥2.000.000 g/mol, most preferably ≥5.000.000 g/mol, and/or
ii) preferably, the lower molecular weight peak (P1.1) has an average sedimentation coefficient of ≤10 Sved, more preferably ≤5 Sved, most preferably of ≤1.5 Sved, and the higher molecular weight peak (P1.2) has an average sedimentation coefficient of >10 Sved.

The water-soluble polymer components of the cationic polymer may vary. It may be from 5 to 95% by weight related to the total amount of cationic polymer. The solubility of the cationic polymer is determined by methods known to those skilled in the art, for example, by admixing the cationic polymer present in the inventive inverse dispersion with a defined amount of water (see, for example, EP-A 343 840 or preferably the above mentioned determination method of the sedimentation coefficient in the unit of svedberg (sved) according to P. Schuck). Furthermore, it is preferred that the water-soluble polymer components of the cationic polymer are between 25 to 90% by weight, more preferably between 35 and 75% by weight, most preferably between 50 and 60% by weight, related to the total amount of cationic polymer.

Preferably, the cationic polymer is prepared by polymerization of
a) 20 to 99.99% by weight, preferably 95 to 99.95% by weight, related to the total amount of cationic polymer, of at least one cationic monomer and optionally at least one nonionic monomer, b) 10 to 500 ppm, preferably 30 to 490 ppm, more preferably 50 to 400 ppm, even more preferably less than 375 ppm, related to the total amount of cationic polymer, of at least one crosslinker,
c) 0 to 3% by weight, preferably 0.05 to 0.5% by weight, related to the total amount of cationic polymer, of optionally at least one chain transfer agent,
d) 0 to 80% by weight, preferably 0.05 to 5% by weight, more preferably 0.1 to 1% by weight, related to the total amount of cationic polymer, of optionally at least one associative monomer.

The polymerization of the cationic polymer according to the process of the present invention is carried out in two subsequent steps I) and II) with:
 I) polymerization of monomer component a) and monomer component b),
 II) polymerization of monomer component a), optionally monomer component c) and in the complete absence or in the presence of <10 ppm (related to the total amount of polymer) of monomer component b),
 wherein step II) is carried out after the polymerization of step 1) is finished or step 1) is carried out after the polymerization of step II) is finished.

The polymerization of steps I) and II) as such is known to the person skilled in the art. The above-described steps I) and II) can be carried out by any method known to the person skilled in the art. The order of carrying out the steps I) and II) can be freely chosen. It is even possible to carry out step 1) and II) for several times as independent batches. However, it is preferred to first carry out step I) and, after the polymerization is finished, step II) follows.

It is preferred that the polymerization for obtaining the cationic polymer according to the process of the present invention is carried out under consideration of at least one of the following options i) to v), wherein
 i) step II) is carried out after the polymerization of step 1) is finished, and/or
 ii) step II) is carried out by polymerization of monomer component a), monomer component c) and optionally monomer component d), and/or
 iii) monomer component b) is completely absent during the polymerization according to step II), and/or
 iv) step 1) is carried out by polymerization of monomer component a), 10 to 10.000 ppm, preferably 100 to 2000 ppm, more preferably 500 to 1000 ppm, (related to the total amount of cationic polymer) of monomer component b) and optionally monomer component c), and/or
 v) in step II), 5 to 95% by weight, preferably 25 to 90% by weight, more preferably between 35 and 75% by weight, even more preferably between 50 and 60% by weight of the water-soluble polymer components of the cationic polymer are produced related to the total amount of cationic polymer.

The temperature of the individual steps I) and II) can be chosen freely and independently from each other. However, it is preferred that
 i) step 1) is initiated at a lower temperature than the temperature of step II), and/or
 ii) step 1) is carried out at a temperature in the range of −5° C. to 40° C., preferably in the range of 20° C. to 30° C., more preferably the temperature is kept constant during step 1), and/or
 iii) step II) is carried out at a temperature in the range of 70° C. to 120° C., preferably in the range of 80° C. to 100° C., more preferably the temperature is kept constant during step II), and/or
 iv) step 1) is started at a temperature in the range of −5° C. to 40° C., preferably in the range of 15° C. to 25° C., and heated-up by the exothermal polymerization under adiabatical conditions.

It is preferred that the polymerization in steps I) and II) is carried out by an emulsion polymerization, preferably by an inverse emulsion polymerization. It is also preferred that steps I) and II) as described above are carried out in the same polymerization vessel. Any vessel suitable for polymerization and known to the skilled person can be used, such as a glass vessel or a reactor.

It is also preferred that the inverse emulsion polymerization is followed by distillation by means of the liquid dispersion polymer technology.

Inverse emulsion polymerization is understood by the person skilled in the art generally to mean polymerization processes according to the following definition: the hydrophilic monomers are dispersed in a hydrophobic oil phase. The polymerization is effected directly in this hydrophilic monomer particle by addition of initiator.

In addition, it is preferred that, after the inverse emulsion polymerization and before the addition of activator (as defined below in more detail), at least a portion of water and at least a portion of the low-boiling constituents of the oil phase are distilled off, especially by means of LDP technology (Liquid Dispersion Polymer Technology). LDP technology as such is known to those skilled in the art; it is described, for example, in WO 2005/097834.

The information which follows, unless stated otherwise, applies to all kinds of emulsion polymerization (under consideration of step 1) and/or step II) as defined above), for example to emulsion polymerization in water, which then constitutes the continuous phase, and especially also to inverse emulsion polymerization in which the hydrophobic oil phase constitutes the continuous phase. A suitable polymerization initiator is used for the polymerization. Redox initiators and/or thermally activatable free-radical polymerization initiators are preferred.

Suitable thermally activatable free-radical initiators or the oxidative component of the redox initiator pair are in particular those of the peroxy and azo type. These include hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis (hydroperoxy)hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dieicosyl peroxydicarbonate, di-t-butyl perbenzoate, azobisisobutyronitrile, 2,2'-azobis-2,4-dimethylvaleronitrile, ammonium persulfate, potassium persulfate, sodium persulfate and sodium perphosphate.

The persulfates (peroxodisulfates), especially sodium persulfate, are most preferred.

In the performance of the emulsion polymerization, the initiator is used in a sufficient amount to initiate the polymerization reaction. The initiator is typically used in an amount of about 0.01 to 3% by weight, based on the total weight of the monomers used. The amount of initiator is preferably about 0.05 to 2% by weight and especially 0.1 to 1% by weight, based on the total weight of the monomers used.

The emulsion polymerization is effected typically at 0° C. to 100° C. It can be performed either as a batch process or in the form of a feed process. In the feed method, at least a portion of the polymerization initiator and optionally a portion of the monomers are initially charged and heated to polymerization temperature, and then the rest of the polymerization mixture is supplied, typically over several separate feeds, one or more of which comprise the monomers in pure or emulsified form, continuously or stepwise while maintaining the polymerization. Preference is given to supplying the monomer in the form of a monomer emulsion. In parallel to the monomer supply, further polymerization initiator can be metered in.

In preferred embodiments, the entire amount of initiator is initially charged, i.e. there is no further metering of initiator parallel to the monomer feed.

In a preferred embodiment, the thermally activatable free-radical polymerization initiator is therefore initially charged completely and the monomer mixture, preferably in the form of a monomer emulsion, is fed in. Before the feeding of the monomer mixture is started, the initial charge is brought to the activation temperature of the thermally activatable free-radical polymerization initiator or a higher temperature. The activation temperature is considered to be the temperature at which at least half of the initiator has decomposed after one hour.

In another preferred preparation method, the cationic polymer is obtained by polymerization of a monomer mixture in the presence of a redox initiator system. A redox initiator system comprises at least one oxidizing agent component and at least one reducing agent component, in which case heavy metal ions are preferably additionally present as a catalyst in the reaction medium, for example salts of cerium, manganese or iron(II).

Suitable oxidizing agent components are, for example, peroxides and/or hydroperoxides such as hydrogen peroxide, tert-butyl hydroperoxide, cumene hydroperoxide, pinane hydroperoxide, diisopropylphenyl hydroperoxide, dicyclohexyl percarbonate, dibenzoyl peroxide, dilauroyl peroxide and diacetyl peroxide. Hydrogen peroxide and tert-butyl hydroperoxide are preferred.

Suitable reducing agent components are alkali metal sulfites, alkali metal dithionites, alkali metal hyposulfites, sodium hydrogensulfite, Rongalit C (sodium formaldehydesulfoxylate), mono- and dihydroxyacetone, sugars (e.g. glucose or dextrose), ascorbic acid and salts thereof, acetone bisulfite adduct and/or an alkali metal salt of hydroxymethanesulfinic acid. Sodium hydrogensulfite or sodium metabisulfite is preferred.

Suitable reducing agent components or catalysts are also iron(II) salts, for example iron(II) sulfate, tin(II) salts, for example tin(II) chloride, titanium(III) salts such as titanium(Ill) sulfate.

The amounts of oxidizing agent used are 0.001 to 5.0% by weight, preferably from 0.005 to 1.0% by weight and more preferably from 0.01 to 0.5% by weight, based on the total weight of the monomers used. Reducing agents are used in amounts of 0.001 to 2.0% by weight, preferably of 0.005 to 1.0% by weight and more preferably of 0.01 to 0.5% by weight, based on the total weight of the monomers used.

A particularly preferred redox initiator system is the sodium peroxodisulfate/sodium hydrogensulfite system, for example 0.001 to 5.0% by weight of sodium peroxodisulfate and 0.001 to 2.0% by weight of sodium hydrogensulfite, especially 0.005 to 1.0% by weight of sodium peroxodisulfate and 0.005 to 1.0% by weight of sodium hydrogensulfite, more preferably 0.01 to 0.5% by weight of sodium peroxodisulfate and 0.01 to 0.5% by weight of sodium hydrogensulfite.

A further particularly preferred redox initiator system is the t-butyl hydroperoxide/hydrogen peroxide/ascorbic acid system, for example 0.001 to 5.0% by weight of t-butyl hydroperoxide, 0.001 to 5.0% by weight of hydrogen peroxide and 0.001 to 2.0% by weight of ascorbic acid, especially 0.005 to 1.0% by weight of t-butyl hydroperoxide, 0.005 to 1.0% by weight of hydrogen peroxide and 0.005 to 1.0% by weight of ascorbic acid, more preferably 0.01 to 0.5% by weight of t-butyl hydroperoxide, 0.01 to 0.5% by weight of hydrogen peroxide and 0.01 to 0.5% by weight of ascorbic acid.

The cationic polymer is preferably prepared by inverse emulsion polymerization, by first separately preparing an aqueous phase of the water-soluble components and an oil phase. Thereafter, the two phases are mixed with one another to obtain a water-in-oil dispersion. The mixture is polymerized by adding a redox initiator system; optionally, another, thermal initiator can subsequently be added or, if already present, thermally activated.

The aqueous phase comprises, for example, a chain transfer agent, a crosslinker, a cationic monomer and optionally an uncharged monomer, and/or an associative monomer, and optionally further components. Suitable further components (as defined below in more detail) are, for example, complexing agents for salts such as pentasodium diethylenetriaminepentaacetic acid, or compounds which can be used to adjust the pH and/or stabilizing agents, such as citric acid.

The oil phase comprises, for example, an emulsifier, a stabilizer, a high-boiling oil, a low-boiling oil and/or optionally an associative monomer. In addition, the oil phase may optionally comprise a nonionic monomer.

In a preferred embodiment of the present invention, component d) (at least one ethylenically unsaturated associative monomer) is added to the oil phase in the inverse emulsion polymerization.

In the inverse emulsion polymerization, the temperature can be kept constant or else it can rise. The rise in the temperature can be performed continuously or in stages. For example, the temperature can rise by 0.2 to 10° C. per minute during the polymerization, preferably from 1 to 3° C. per minute. The temperature rise is controlled by the rate of initiator addition. The starting temperature value may be 0 to 30° C., preferably 10 to 20° C.

In another embodiment of the present invention, the temperature in the inverse emulsion polymerization is kept constant (cold method); the temperature is 0 to 30° C., preferably 10 to 20° C. In a further embodiment of the present invention, the temperature is kept constant within a higher temperature range (hot method). The temperature in the polymerization is to 150° C., preferably 70 to 120° C.

In a particularly preferred embodiment of the present invention, the temperature is kept constant during the inverse emulsion polymerization, the temperature being at least 40° C., preferably 50 to 90° C.

If, in the context of the present invention, the temperature is kept constant in a polymerization, especially in an inverse emulsion polymerization, this means that the temperature is kept at a constant value from the start of the polymerization. Variations of +/−5° C., preferably +/−2° C. and especially +/−1° C. during the polymerization process are considered to be a constant temperature (based on the desired constant temperature value). The temperature is kept constant until the polymerization has ended, which is preferably the case after a conversion of more than 90% of the monomers used, more preferably more than 95% by weight and especially preferably at full conversion (100% by weight). The temperature can be kept constant by removing the heat of reaction which arises by cooling. The start of the polymerization is normally the addition of the polymerization initiator, preferably the addition of a redox initiator system.

Normally, the system is first heated to the desired temperature and a constant temperature is awaited while stirring. Subsequently, the polymerization initiator is added, as a result of which the polymerization process commences. In one embodiment of the present invention, the temperature is kept constant at a value above the melting point of the associative monomer used.

It is even more preferred,
- i) in both steps I) and II), an aqueous phase and an oil phase are employed, and/or
- ii) the aqueous phase in step 1) contains at least one cationic monomer, at least one crosslinker and optionally at least one nonionic monomer, and/or
- iii) the oil phase in step 1) and/or step II) contains at least one stabilizing agent, at least one low-boiling oil, at least one high-boiling oil and optionally at least one associative monomer, and/or
- iv) the aqueous phase in step II) contains at least one cationic monomer, optionally at least one nonionic monomer, and optionally at least one chain transfer agent, and/or
- v) in step II), the mixture of the aqueous phase and the oil phase is completely added to the polymerization vessel (batch reaction) and afterwards the initiators are added continuously, and/or
- vi) in step II), the mixture of the aqueous phase and the oil phase is continuously added to the polymerization vessel (continuous reaction) and the initiators are added prior to said mixture or the initiators are added continuously and in parallel to said mixture into the polymerization vessel.

It is also preferred that in step II) ≥5%, preferably ≥25%, most preferably ≥50% by weight of the water-soluble polymer components of the cationic polymer are produced related to the total amount of cationic polymer.

In a preferred embodiment of the present invention, the cationic polymer is obtained by polymerization of
- a) at least one cationic monomer and optionally at least one nonionic monomer (monomer component a),
- b) at least one crosslinker (monomer component b),
- c) optionally at least one chain transfer agent (monomer component c),
- wherein the cationic polymer has an at least trimodal molecular weight distribution with i) at least one first peak (P1) with an average sedimentation coefficient of ≤10 Sved, wherein the first peak (P1) is splitted into at least two peaks (P1.1, P1.2, . . . P.X) and with ii) at least one second peak (P2) with an average sedimentation coefficient of ≥10.000 Sved,
- and the water-soluble polymer components of the cationic polymer are between 25 to 90% by weight related to the total amount of cationic polymer,
- and wherein the polymerization is carried out in two subsequent steps I) and II) with:
  - I) polymerization of monomer component a) and monomer component b),
  - II) polymerization of monomer component a), optionally monomer component c) and in the complete absence or in the presence of <10 ppm (related to the total amount of polymer) of monomer component b), wherein step II) is carried out after the polymerization of step 1) is finished and wherein in step II) between 25 to 90% by weight of the water-soluble polymer components of the cationic polymer are produced related to the total amount of cationic polymer.

Within this embodiment it is more preferred that
- i) monomer component a) comprises at least one cationic monomer and at least one nonionic monomer, and/or
- ii) monomer component b) is employed during the polymerization according to step 1) in an amount of 30 to 490 ppm, more preferably 50 to 400 ppm, (related to the total amount of cationic polymer) and monomer component b) is completely absent during the polymerization according to step II), and/or
- iii) monomer component c) is present, and/or
- iv) the lower molecular weight peak (P1.1) has an average sedimentation coefficient of ≤3 Sved, more preferably of ≤1.5 Sved, and the higher molecular weight peak (P1.2) has an average sedimentation coefficient of >3 Sved.

Within this embodiment it is even more preferred that
- i) the cationic monomer is [2-(acryloyloxy)ethyl]trimethylammonium chloride or trimethyl-[2-(2-methylprop-2-enoyloxy)ethyl]azanium chloride, and the one nonionic monomer is acrylamide, and/or
- ii) monomer component b) is selected from N,N'-methylenebisacrylamide, pentaerythrityl triacrylate or pentaerythrityl tetraacrylate, and/or
- iii) monomer component c) is formic acid or sodium hypophosphite.

The present invention further provides a process (as defined above), wherein an inverse dispersion comprises the at least one cationic polymer as defined above. Methods for producing such an inverse dispersion are also described in context with the (inverse) emulsion polymerization.

The inverse dispersion may further comprise at least one oil (phase), at least one activator, at least one stabilizing agent, optionally at least one complexing agent and optionally additional additives. Preferably, the inverse dispersion is a water-in-oil emulsion.

Activators, stabilizing agents (stabilizers) such as emulsifiers, oils such as low-boiling oils and high-boiling oils and/or any further components as such, which may be present within the inventive inverse dispersion, are known to those skilled in the art. These compounds can be used individually or in the form of mixtures.

Activators as such are known in principle to those skilled in the art. Suitable activators are preferably surfactants, for example anionic, nonionic, cationic and/or amphoteric surfactants, which are disclosed, for example, in WO 2009/019225. Preference is given to using anionic and/or nonionic surfactants.

The nonionic surfactants used are preferably fatty alcohol alkoxylates. Fatty alcohol alkoxylates are also referred to as polyalkylene glycol ethers. Preferred fatty alcohol alkoxylates are alkoxylated, advantageously ethoxylated, especially primary alcohols having preferably 8 to 18 carbon atoms and an average of 1 to 12 mol of ethylene oxide (EO) per mole of alcohol, in which the alcohol radical may be linear or branched, preferably 2-methyl-branched, or may comprise linear and methyl-branched radicals in a mixture, as typically present in oxoalcohol radicals. Especially preferred are, however, alcohol ethoxylates with linear radicals formed from alcohols of native or technical origin with 12 to 18 carton atoms, for example formed from coconut alcohol, palm alcohol, tallow fat alcohol or oleyl alcohol—or mixtures as derivable, for example, from castor oil—and an average of 2 to 8 EO per mole of alcohol. The preferred ethoxylated alcohols include, for example, $C_{12}$-$C_{14}$-alcohols with 3 EO, 4 EO or 7 EO, $C_9$-$C_{11}$-alcohol with 7 EO, $C_3$-$C_{15}$-alcohols with 3 EO, 5 EO, 7 EO or 8 EO, $C_{12}$-$C_{18}$-alcohols with 3 EO, 5 EO or 7 EO and mixtures thereof such as mixtures of $C_{12}$-$C_{14}$-alcohol with 3 EO and $C_{12}$-$C_{18}$-alcohol with 7 EO. The degrees of ethoxylation reported are statistical averages which may be an integer or a fraction for a specific product. Preferred alcohol ethoxylates have a narrow homolog distribution (narrow range ethoxylates, NRE). In addition to these nonionic surfactants, it is also possible to use fatty alcohols with more than 12 EO. Examples thereof are tallow fat alcohol with 14 EO, 25 EO, 30 EO or 40 EO. It is also possible to use nonionic surfactants comprising EO and PO groups together in a molecule. In this context, it is possible to use block copolymers with EO-PO block units or PO-EO block units, but also EO-PO-EO copolymers or PO-EO-PO copolymers. It will be appreciated that it is also possible to use mixed-alkoxylation nonionic surfactants in which EO and PO units are not present in blocks but in random distribution. Such products are obtainable by simultaneous action of ethylene oxide and propylene oxide on fatty alcohols.

In addition, further nonionic surfactants used may also be alkyl glycosides or alkyl polyglycosides. Alkyl glycosides or alkyl polyglycosides are generally understood by the person skilled in the art to mean compounds composed of at least one alkyl fragment and at least one sugar or polysugar fragment. The alkyl fragments preferably derive from fatty alcohols having a carbon atom number of 12 to 22, and the sugar fractions preferably from glucose, sucrose or sorbitan.

For example, it is possible to use alkyl glycosides of the general formula (1)

(1)

in which R' is a primary straight-chain or methyl-branched, especially 2-methyl-branched, aliphatic radical having 8 to 22 and preferably 12 to 18 carbon atoms, and G is a glycoside unit having 5 or 6 carbon atoms, preferably glucose. The degree of oligomerization x, which specifies the distribution of monoglycosides and oligoglycosides, is any number between 1 and 10; x is preferably 1.2 to 1.4.

A further class of nonionic surfactants used with preference, which are used either as the sole nonionic surfactant or in combination with other nonionic surfactants, is that of alkoxylated, preferably ethoxylated or ethoxylated and propoxylated, fatty acid alkyl esters, preferably having 1 to 4 carbon atoms in the alkyl chain, especially fatty acid methyl esters, as described, for example, in Japanese patent application JP 58/217598, or which are preferably prepared by the process described in international patent application WO-A-90/13533.

Nonionic surfactants of the amine oxide type may also be suitable, for example N-cocoalkyl-N,N-dimethylamine oxide and N-tallowalkyl-N,N-dihydroxyethylamine oxide, and of the fatty acid alkanolamide type. The amount of these nonionic surfactants is preferably not more than that of the ethoxylated fatty alcohols, especially not more than half thereof.

Further suitable surfactants are polyhydroxy fatty acid amides of the formula (2),

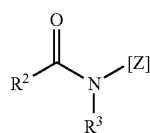
(2)

in which $R^2C(=O)$ is an aliphatic acyl radical having 6 to 22 carbon atoms, $R^3$ is hydrogen, an alkyl or hydroxyalkyl radical having 1 to 4 carbon atoms, and [Z] is a linear or branched polyhydroxyalkyl radical having 3 to 10 carbon atoms and 3 to 10 hydroxyl groups. The polyhydroxy fatty acid amides are known substances, which can be obtained typically by reductive amination of a reducing sugar with ammonia, an alkylamine or an alkanolamine, and subsequent acylation with a fatty acid, a fatty acid alkyl ester or a fatty acid chloride.

The group of the polyhydroxy fatty acid amides also includes compounds of the formula (3)

(3)

in which $R^4$ is a linear or branched alkyl or alkenyl radical having 7 to 12 carbon atoms, $R^5$ is a linear, branched or cyclic alkylene radical having 2 to 8 carbon atoms or an arylene radical having 6 to 8 carbon atoms, and $R^6$ is a linear, branched or cyclic alkyl radical or an aryl radical, or an oxyalkyl radical having 1 to 8 carbon atoms, preference being given to $C_1$-$C_4$-alkyl or phenyl radicals, and $[Z]^1$ is a linear polyhydroxyalkyl radical whose alkyl chain is substituted by at least two hydroxyl groups, or alkoxylated, preferably ethoxylated or propoxylated, derivatives of this radical. $[Z]^1$ is preferably obtained by reductive amination of a sugar, for example glucose, fructose, maltose, lactose, galactose, mannose or xylose. The N-alkoxy- or N-aryloxy-substituted compounds can then be converted to the desired polyhydroxy fatty acid amides, for example, according to WO-A-95/07331 by reaction with fatty acid methyl esters in the presence of an alkoxide as a catalyst.

The anionic surfactants used are, for example, those of the sulfonate and sulfate type. Useful surfactants of the sulfonate type include alkylbenzenesulfonates, preferably $C_9$-$C_{13}$-alkylbenzenesulfonates, olefinsulfonates, i.e. mixtures of alkene- and hydroxyalkanesulfonates, and disulfonates as obtained, for example, from $C_{12}$-$C_{18}$-monoolefins with terminal or internal double bonds by sulfonation with gaseous sulfur trioxide and subsequent alkaline or acidic hydrolysis of the sulfonation products. Also suitable are alkanesulfonates, preferably secondary alkanesulfonates, which are obtained, for example, from $C_{12}$-$C_{18}$-alkanes by sulfochlorination or sulfoxidation with subsequent hydrolysis or neutralization. Equally suitable are also the esters of α-sulfone fatty acids (ester sulfonates), for example the α-sulfonated methyl esters of hydrogenated coconut fatty acids, palm kernel fatty acids or tallow fatty acids.

Further suitable anionic surfactants are sulfonated fatty acid glyceryl esters. Fatty acid glyceryl esters are understood to mean the mono-, di- and triesters, and mixtures thereof as obtained in the preparation by esterification of a monoglycerol with 1 to 3 mol of fatty acid or in the transesterification of triglycerides with 0.3 to 2 mol of glycerol. Preferred sulfonated fatty acid glyceryl esters are the sulfonation products of saturated fatty acids having 6 to 22 carbon atoms, for example of caproic acid, caprylic acid, capric acid, myristic acid, lauric acid, palmitic acid, stearic acid or behenic acid.

Further suitable anionic surfactants are fatty alcohol sulfates, for example alk(en)yl sulfates. Preferred alk(en)yl sulfates are the alkali metal and especially the sodium salts of the sulfuric monoesters of the $C_{12}$-$C_{18}$ fatty alcohols, for example of coconut fatty alcohol, tallow fatty alcohol, lauryl alcohol, myristyl alcohol, cetyl alcohol or stearyl alcohol, or of the $C_{10}$-$C_{20}$ oxo alcohols and those monoesters of secondary alcohols of these chain lengths.

Additionally preferred are alk(en)yl sulfates of the chain length mentioned which comprise a synthetic straight-chain alkyl radical produced on a petrochemical basis, which have analogous degradation behavior to the equivalent compounds based on fatty-chemical raw materials. In the interests of washing technology, preference is given to the $C_{12}$-$C_{16}$-alkyl sulfates and $C_{12}$-$C_{15}$-alkyl sulfates, and also $C_{14}$-$C_{15}$-alkyl sulfates. Suitable anionic surfactants are also 2,3-alkyl sulfates, which are prepared, for example, according to U.S. Pat. No. 3,234,258 or 5,075,041 and can be obtained as commercial products from Shell Oil Company under the DAN® name.

Also suitable are the sulfuric monoesters of the straight-chain or branched $C_7$-$C_{21}$-alcohols ethoxylated with 1 to 6 mol of ethylene oxide, such as 2-methyl-branched $C_9$-$C_{11}$ alcohols with an average of 3.5 mol of ethylene oxide (EO) or $C_{12}$-$C_{18}$-fatty alcohols with 1 to 4 EO.

Further suitable anionic surfactants are also the salts of alkylsulfosuccinic acid, which are also referred to as sulfosuccinates or as sulfosuccinic esters, and which are monoesters and/or diesters of sulfosuccinic acid with alcohols, preferably fatty alcohols and especially ethoxylated fatty alcohols. Preferred sulfosuccinates comprise $C_8$-$C_{18}$-fatty alcohol radicals or mixtures thereof. Especially preferred sulfosuccinates comprise a fatty alcohol radical which derives from ethoxylated fatty alcohols. Particular preference is given in turn to sulfosuccinates whose fatty alcohol radicals derive from ethoxylated fatty alcohols with narrow homolog distribution. It is likewise also possible to use alk(en)ylsuccinic acid with preferably 8 to 18 carbon atoms in the alk(en)yl chain or salts thereof.

Further suitable anionic surfactants are alkyl carboxylates, for example the sodium salts of saturated or unsaturated fatty acids, where the alkyl radical of the alkyl carboxylate is preferably linear.

In the context of the present invention, the activator is preferably selected from fatty alcohol alkoxylates, alkyl glycosides, alkyl carboxylates, alkylbenzenesulfonates, secondary alkanesulfonates and fatty alcohol sulfates, more preferably selected from fatty alcohol alkoxylates. One example of a preferred fatty alcohol alkoxylate is $C_6$-$C_{17}$ (secondary)-poly(3-6)ethoxylate.

It is additionally preferred in the context of the present invention to use an activator which has a (relatively) high HLB (hydrophilic-lipophilic balance) value. The activator preferably has an HLB value of 7 to 18, more preferably of 8 to 15 and especially preferably of 9 to 13.

Activators with a high HLB value are preferably i) fatty alcohol alkoxylates formed from secondary alcohols or mixtures of alcohols having 12 to 18 carbon atoms and ethylene oxide or propylene oxide, and ii) alkyl glycosides formed from sucrose and $C_8$ to $C_{22}$ fatty alcohols. Examples of such activators are the commercially available Synperonic 87K from Croda GmbH, Herrenpfad-Sd 33, 41334 Nettetal, Germany; Croduret 40 or other ethoxylated hydrogenated castor oils (ricinus oils) such as Etocas 40 or Crodesta F110, all from Croda.

In a further embodiment of the present invention, it is preferred to use a mixture of at least two activators, at least one activator having a high HLB value and at least one activator a low HLB value. The activator with a high HLB value preferably has a HLB value of >12 to 20, and the activator with a low HLB value preferably has an HLB value of 1 to 12. In this embodiment, the activator with a high HLB value and the activator with a low HLB value may be present in any desired ratios known to those skilled in the art. Preferably, in the mixture, 20 to 50% by weight of activator with high HLB value and 50 to 80% by weight of activator with low HLB value are used. Additionally preferably, this ratio of activator with high HLB value to activator with low HLB value is adjusted such that the overall HLB value is 7 to 18, more preferably 8 to 15 and especially preferably 9 to 13.

In these mixtures of at least two activators, the activators with a high HLB value used are preferably alkyl glycosides or polyalkyl glycosides or polyalkyl oligoethylene oxide glycoside based on sucrose or sorbitan and $C_8$ to $C_{22}$ fatty alcohols such as polyethylene glycol sorbitan monostearate or polyoxyethylene sorbitan monostearate. Examples of such activators are the commercially available Crillet 1, Crillet 3 or Crodesta F160, all obtainable from Croda. The activators used with a low HLB value are preferably alkyl glycosides formed from sucrose or sorbitan and $C_8$ to $C_{22}$ fatty alcohols or fatty acids, such as sorbitan laurate or sorbitan stearate. Examples of such activators are the commercially available Crill 1, Crill 3 or Crodesta F10 from Croda.

According to the invention, the ratio of activator to the cationic polymer is preferably >10:100 [% by weight/% by weight], preferably 10.5 to 50:100 [% by weight/% by weight], more preferably 11.5 to 20:100 [% by weight/% by weight].

Suitable stabilizing agents are preferably emulsifiers such as polymeric emulsifiers. Typical emulsifiers are anionic emulsifiers, for example sodium laurylsulfate, sodium tridecyl ether sulfates, dioctylsulfosuccinate sodium salt and sodium salts of alkylaryl polyether sulfonates; and nonionic emulsifiers, for example alkylaryl polyether alcohols and ethylene oxide-propylene oxide copolymers. Sorbitan trioleate is likewise suitable as an emulsifier.

Preferred emulsifiers have the following general formula:

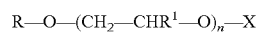

in which
R is $C_6$-$C_{30}$-alkyl,
R' is hydrogen or methyl,
X is hydrogen or $SO_3M$,
M is hydrogen or one alkali metal, and
n is an integer from 2 to 100.

Further suitable stabilizers are described, for example, in EP-A 172 025 or EP-A 172 724.

Preferred stabilizers are copolymers of stearyl methacrylate and methacrylic acid.

According to this invention it is further preferred to employ having more than 30 carbon atoms, preferably more than 50 carbon atoms containing hydrophobic chains. The employment of such emulsifier as stabilizing agent is resulting in a dramatic increase of the stabilizing effect for the hydrophilic polymer particles dispersed in the hydrophobic continuous phase. In general are claimed for that purpose all emulsifiers or polymeric stabilizers containing more than 30 carbon atoms, preferably more than 50 carbon atoms in their hydrophobic chains. Optional this hydrophobic chain can be interrupted after every 6, preferred 10 or more carbon atoms by other atoms like oxygen, nitrogen, sulphur, phosphor or by groups like carbonate, isocyanate, carbamide, esters or others in an amount that they do not essentially disturb the hydrophobic character of the chain in order to get the low HLB-values as described below. Block-, graft- or comb-structure, preferably are based on polyhydroxystearic acid.

In the block-structure the AB- or especially ABA-blocks are preferred. In the ABA block-structure the A block is preferably based on polyhydroxystearic acid and the B block on polyalkylene oxide.

The preferred concentration of these inventive stabilizing agents lies between 0.1% and 10%, preferably between 1% to 5% by weight related to the total weight of the cationic polymer.

The polymeric emulsifiers are more preferably a block copolymers having a general formula A-COO—B—OOC-A, in which B is the divalent residue of a water-soluble polyalkylene glycol and A is the residue of an oil-soluble complex monocarboxylic acid. Such polymeric emulsifiers, as well as the preparation thereof, have been disclosed in GB 2002400 and WO9607689, the contents of which are herewith incorporated by reference. The emulsifiers, as described in GB2002400, are emulsifiers wherein A has a molecular weight of at least 500 and is the residue of an oil-soluble complex monocarboxylic acid, i.e. a fatty acid. These complex monocarboxylic acids may be represented by the general formula:

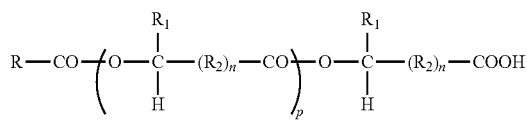

in which

R is hydrogen or a monovalent hydrocarbon or substituted hydrocarbon group;

R1 is hydrogen or a monovalent C1 to C24 hydro-carbon group;

R2 is a divalent C1 to C24 hydrocarbon group;

n is zero or 1;

p is an integer from zero to 200.

The units between the brackets in formula 1 may be all the same or they may differ in respect of R1, R2 and n. The quantity p will not normally have the same unique value for all molecules of the complex acid but will be statistically distributed about an average value lying within the range stated, as is commonplace in polymeric materials. Polymeric component B has a molecular weight of at least 500 and is the divalent residue of a water-soluble polyalkylene glycol having the general formula

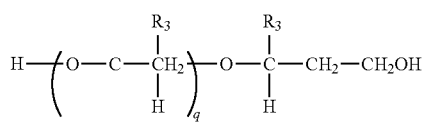

wherein

R3 is hydrogen or a C1 to C3 alkyl group;

q is an integer from 10 up to 500.

Most preferred emulsifiers used in the invention are e.g. PEG 30 Dipolyhydroxystearate.

Another similar emulsifier for use with the invention are block copolymers (A-B-A) of polyethylene glycol and polyhydroxystearic acid with a mol weight of approximately 5000.

Furthermore the use of these ABA type block copolymers lead to water-in-oil emulsions having excellent stability during storage thus improving the shelf life of said emulsions. The resulting water-in-oil emulsions are stable and fluid at low temperatures, especially at 25° C.

Suitable high-boiling oils are, for example, 2-ethylhexyl stearate and hydroheated heavy naphtha, and suitable low-boiling oils are, for example, dearomatized aliphatic hydrocarbons or mineral oils of low viscosity.

In a preferred embodiment of the present invention, the inverse dispersion comprises at least one stabilizing agent wherein the stabilizing agent has one or more hydrophobic chains with more than 30 carbon atoms, preferably more than 50 carbon atoms, more preferably the stabilizing agent has an ABA block structure based on polyhydroxystearic acid as A block and polyalkylene oxide as B block.

The present invention further relates to a process for obtaining a thickener or deposition aid comprising at least one cationic polymer as defined above or at least one inverse dispersion as defined above.

The invention is illustrated hereinafter by the examples.

EXAMPLES

In the examples, the following abbreviations are used:

Monomers

ACM Acrylamide

DMA3*MeCl 2-trimethylammoniumethyl acrylate chloride or 2-(Acryloyloxy)ethyl]trimethylammoniumchloride DMAEMA*MeCl 2-trimethylammoniumethyl methacrylate chloride BEM behenyl-25 methacrylate MBA methylene-bis-acrylamide (crosslinker)

TAAC tetraallyl-ammonium chloride (crosslinker)

PETIA pentaerythrityl tri/tetraacrylate (crosslinker)

TMPTA EOx Trimethylolpropane tris(polyethylene glycol ether) triacrylate (TMPTA EOx) (crosslinker)

NaHP sodium hypophosphite (chain transfer agent)

C16EO25MAc $C_{16}$-$C_{18}$-fatty alcohol-(ethylene glycol)$_{25}$ ether methacrylate Others Dehymuls LE PEG 30 dipolyhydroxystearate Wako V 59 2,2'-azobis(2-methylbutyronitrile)

pphm parts per hundred parts of monomers [which corresponds to (10 to the power of 4) multiplied with (ppm related to total amount of polymer)]

General Test Methods

Unless stated otherwise, the following general test methods are used in the examples which follow:

Determination of Viscosity in Aqueous Media

With reference to the methods according to DIN 51550, DIN 53018, DIN 53019, the Brookfield model DV II viscometer is used, unless stated otherwise within the following tables, at the speed of 10 or 60 revolutions per minute with the specified spindle no. 2, 3 or 6 to measure the viscosities reported in mPas.

Determination of viscosity at 25° C. of 1 wt % aqueous solution product (approximately 50 wt % active polymer)—Brookfield viscosity is measured using a Brookfield DVII—fitted with a spindle 3 at 10 rpm. The test is conducted in deionised water at 25° C. Initial viscosity is defined as the Brookfield viscosity measured within 35 minutes of making the sample. Determination of viscosity at 25° C. of an aqueous solution containing 0.4 wt % product (approximatively 50 wt % active polymer) and 100 ppm calcium chloride—Brookfield viscosity is measured using a Brookfield DVII—fitted with a spindle 2 at 60 rpm. The test is conducted in 100 ppm calcium chloride solution in deionised water at 25° C. Initial viscosity is defined as the Brookfield viscosity measured within 2 hours of making the sample.

Assessing Phase and Brookfield Viscosity Stability

Brookfield viscosity is measured using a Brookfield DV-E viscometer fitted with a LV2 spindle at 60 RPM. The test is conducted in accordance with the instrument's instructions. Initial viscosity is defined as the Brookfield viscosity measured within 24 hours of making the sample. Samples are stored in glass jars with a screw cap lid and aged undisturbed in a constant temperature room maintained at 35° C. Physical stability is assessed by visual observation of the product in the undisturbed glass jar. Products are deemed stable when no clear layer is observed at the bottom of the jar. Products are deemed unstable when a clear layer is observed at the bottom of the jar. Brookfield viscosity of the aged sample is measured after tipping the jar by hand to homogenize the sample.

Determining Viscosity Slope

Acidified water is prepared gravimetrically by adding about 0.1 ppm hydrochloric acid to deionized water. A series of aqueous polymer solutions are prepared to logarithmically span between 0.01 and 1 polymer weight percent of the polymer in said acidic water. Each polymer solvent solutions is prepared gravimetrically by mixing the polymer and solvent with a SpeedMixer DAC 150 FVZ-K (made by FlackTek Inc. of Landrum, S.C.) for 1 minute at 2,500 RPM in a Max 60 cup or Max 100 cup to the target polymer weight percent of the aqueous polymer solution. Viscosity as a function of shear rate of each polymer solvent solutions is measured at 40 different shear rates using an Anton Paar rheometer with a DSR 301 measuring head and concentric cylinder geometry. The time differential for each measurement is logarithmic over the range of 180 and 10 seconds and the shear rate range for the measurements is 0.001 to 500 1/s (measurements taken from the low shear rate to the high shear rate).

Viscosities 0.2 Pa s and greater at a shear rate of 0.01 1/s as a function of polymer weight percent of the aqueous polymer solvent solution was fit using the equation $Y=bX^a$ wherein X was the polymer concentration in the solvent polymer solution, Y was the polymer solvent solution viscosity, b was the extrapolated solvent polymer solution viscosity when X is extrapolated to one weight percent and the exponent a is the polymer concentration viscosity scaling power, here defined as the viscosity slope, over the polymer concentration range where the exponent a is the highest value.

Use of the inventive polymers in standard formulation of fabric softeners

W3: Preparation of a methyltris(hydroxyethyl)ammonium ditallow fatty acid ester methosulfate, partly hydrogenated, fabric softener (active content 5.5%)

The fabric softener formulation has a pH of 2.7 and comprises 5.5% by weight of methyltris(hydroxyethyl)ammonium ditallow fatty acid ester methosulfate (partly hydrogenated) and 94.5% by weight of demineralized water.

Addition of 1 wt % dispersion (approximately 50 wt % active polymer) to fabric softener formulations W3.

The thickener is added gradually at room temperature to the particular fabric softener formulation and stirred until the formulation has homogenized.

The Brookfield viscosity is measured 2 h after the preparation using the Brookfield model DV II viscometer at the speed of 10 revolutions per minute with the specified spindle no. 6 reported in mPas. The results are compiled in Table 2.

Determination of the Soluble and Insoluble Parts of the Polymer Using the Analytical Ultracentrifuge (AUC)

Sample preparation: the sample was diluted with distilled water to 2 g/l polymer and stirred with magnetic stirrer overnight. After that, this solution was diluted to 1 g/l using 0.2 M NaNO3 solution adjusted to pH 4 by HCL. Resulting solution (1 g/l polymer, 0.1 M NaNO3, pH 4) was equilibrated by stirring for 2 hours. Sedimentation velocity runs have been recorded using a Beckman Optima XL-I (Beckman Instruments, Palo Alto, USA) with interference optical detection system (wavelength 675 nm). The centrifugation speed was varied between 1000 rpm and 45,000 rpm.

The sedimentation coefficient, defined as a median value for each fraction, also named as "average sedimentation coefficient" and the concentration of one sedimenting fraction were determined using a standard analysis Software (SEDFIT) using the density and viscosity of the solvent, and a specific refractive index increment of the polymer. The sedimentation coefficient is in units of Sved (1 Sved=$10^{-13}$ seconds). The standard deviation for the determination of weight fraction and sedimentation coefficients of water soluble and crosslinked water-swellable polymers is 3%, 10% and up to 30% respectively. The weight percent of soluble polymer is based on the AUC value.

Determination of the Molecular Weight for the Soluble Part of the Polymers Using the Analytical Field Flow Fractionation (FFF)

Sample preparation: the sample was diluted with distilled water to 2 g/l polymer and stirred with magnetic stirrer overnight. After that, this solution was diluted to 1 g/l using 0.2 M NaNO3 solution adjusted to pH 4 by HCL. Resulting solution (1 g/l polymer, 0.1 M NaNO3, pH 4) was equilibrated by stirring for 2 hours. In order to remove gel particles and oil this sample was centrifuged at 10000 rpm for 20 hours. The clear middle phase was taken out for the analysis with Field Flow Fractionation.

FFF equipment and measurements parameters: Eclipse AF4 (Wyatt) equipped with laser light scattering detector Heleos 2 and concentration (refractive index) detector R.I. Optilab T-Rex., long separation channel with spacer W 350 µm, injection flow: 0.15 ml/min, focus time: 3 min, membrane: Millipore reg. cellulose with molecular weight cut off 10 kD. dn/dc value of 0.14 ml/g was used for the evaluation of the light scattering data (Zimm model). In the case the sample has still contained the traces of microgel this signal was not included into the evaluation range.

Fabric and Test Swatch Preparation Method

Fabrics are assessed under NA Top Load wash conditions using Kenmore FS 600 and/or 80 series washer machines. Wash Machines are set at: 32° C./15° C. wash/rinse temperature, 6 gpg hardness, normal cycle, and medium load (64 liters). Fabric bundles consist of 2.5 kilograms of clean fabric consisting of 100% cotton. Test swatches are included with this bundle and comprise of 100% cotton Euro Touch terrycloth towels (purchased from Standard Textile, Inc. Cincinnati, Ohio). Bundles are stripped according to the Fabric Preparation-Stripping and Desizing procedure before running the test. Tide Free liquid detergent (1× recommended dose) is added under the surface of the water after the machine is at least half full. Once the water stops flowing and the washer begins to agitate, the clean fabric bundle is added. When the machine is almost full with rinse water, and before agitation has begun, the fabric care testing composition is slowly added (1× dose), ensuring that none of the fabric care testing composition comes in direct contact with the test swatches or fabric bundle. When the wash/rinse cycle is complete, each wet fabric bundle is transferred to a corresponding dryer. The dryer used is a Maytag commercial series (or equivalent) dryer, with the timer set for 55 minutes on the cotton/high heat/timed dry setting. This process is repeated for a total of three (3) complete wash-dry cycles. After the third drying cycle and once the dryer stops, 12 Terry towels from each fabric bundle are removed for actives deposition analysis. The fabrics are then placed in a constant Temperature/Relative Humidity (21° C., 50% relative humidity) controlled grading room for 12-24 hours and then graded for softness and/or actives deposition.

The Fabric Preparation-Stripping and Desizing procedure includes washing the clean fabric bundle (2.5 Kg of fabric comprising 100% cotton) including the test swatches of 100% cotton EuroTouch terrycloth towels for 5 consecutive wash cycles followed by a drying cycle. AATCC (American Association of Textile Chemists and Colorists) High Efficiency (HE) liquid detergent is used to strip/de-size the test swatch fabrics and clean fabric bundle (1× recommended dose per wash cycle). The wash conditions are as follows: Kenmore FS 600 and/or 80 series wash machines (or equivalent), set at: 48° C./48° C. wash/rinse temperature, water hardness equal to 0 gpg, normal wash cycle, and medium sized load (64 liters). The dryer timer is set for 55 minutes on the cotton/high/timed dry setting.

Silicone Measurement Method

Silicone is extracted from approximately 0.5 grams of fabric (previously treated according to the test swatch treatment procedure) with 12 mL of either 50:50 toluene:methylisobutyl ketone or 15:85 ethanol:methylisobutyl ketone in 20 mL scintillation vials. The vials are agitated on a pulsed vortexer for 30 minutes. The silicone in the extract is quantified using inductively coupled plasma optical emission spectrometry (ICP-OES). ICP calibration standards of known silicone concentration are made using the same or a structurally comparable type of silicone raw material as the products being tested. The working range of the method is 8-2300 µg silicone per gram of fabric. Concentrations greater than 2300 µg silicone per gram of fabric can be assessed by subsequent dilution. Deposition efficiency index of silicone is determined by calculating as a percentage, how much silicone is recovered, via the aforementioned measurement technique, versus how much is delivered via the formulation examples. The analysis is performed on terrycloth towels (EuroSoft towel, sourced from Standard Textile, Inc, Cincinnati, Ohio) that have been treated according to the wash procedure outlined herein.

Stabilizing Agents Used in the Examples

Stabilizing agent A (nonionic block copolymer): Polyglyceryl-dipolyhydroxystearate with CAS-Nr. 144470-58-6.

Stabilizing agent B is a nonionic ABA-block copolymer with molecular weight of about 5000 g/mol, and a hydrophobic lipophilic balance value (HLB) of 5 to 6, wherein the A block is based on polyhydroxystearic acid and the B block on polyalkylene oxide (see FIG. 1).

Stabilizing agent C (nonionic block copolymer, Dehymuls LE): PEG-30 Dipolyhydroxystearate, with CAS-Nr. 70142-34-6.

Figure 2:
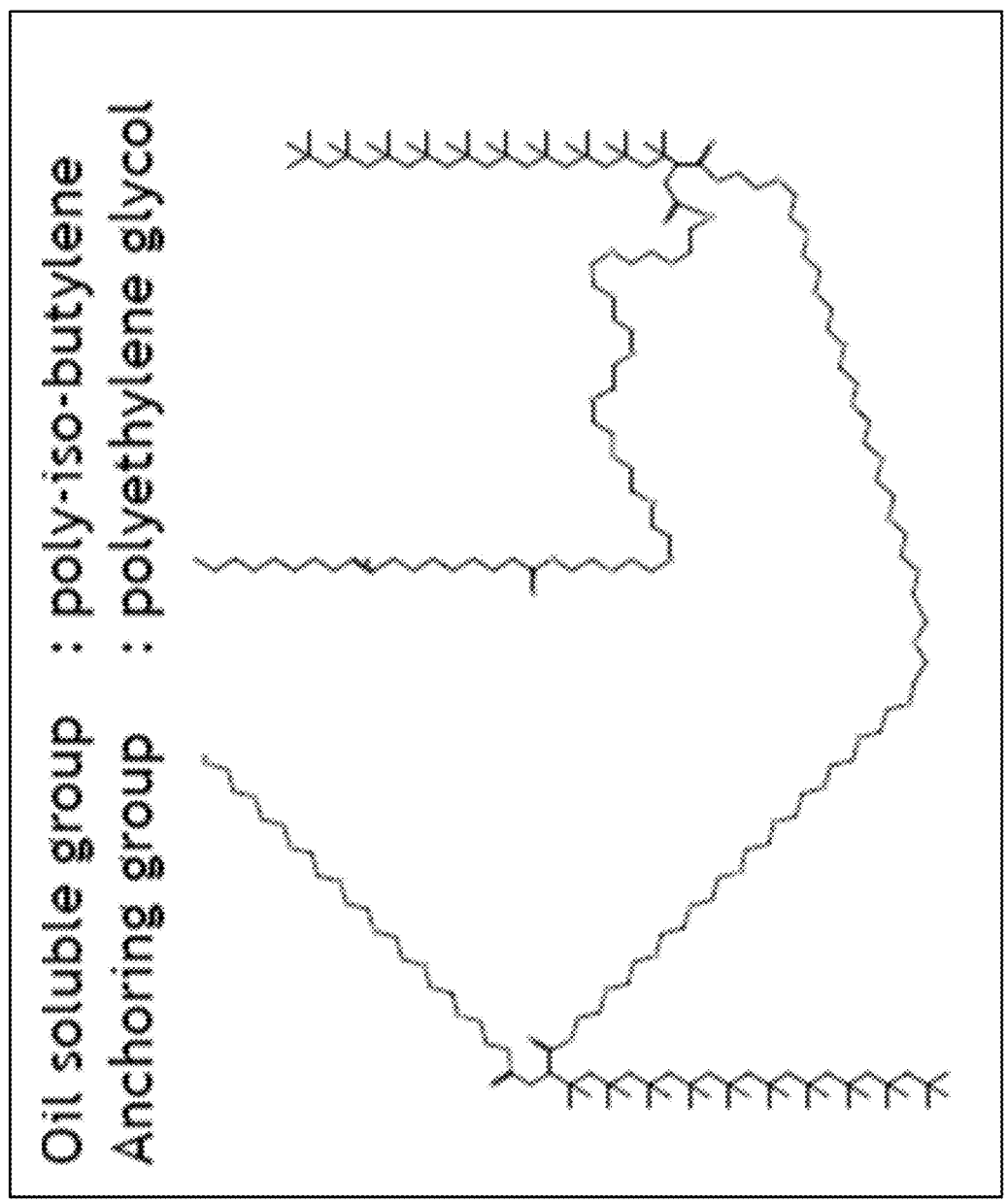
FIG. 2 is an exemplary embodiment of a nonionic block copolymer stabilizing agent D in accordance with the present disclosure.

Stabilizing agent D (nonionic block copolymer): Alcyd Polyethylenglycol Poly-isobutene stabilizing surfactant with HLB 5-7 (see FIG. 2).

Comparative Example 1 (CE1)

Synthesis of the Cationic Polymer

An aqueous phase of water soluble components is prepared by admixing together the following components:

1.23 g (0.5 pphm) of citric acid-1-hydrate,
0.7 g (0.29 pphm) of a aqueous solution of pentasodium diethylenetriaminepentaacetate,
43.78 g (17.85 pphm) of water,
29.56 g (0.12 pphm) of methylene-bis-acrylamide (1% aqueous solution),
8.0 g (0.02 pphm) of sodium hypophosphite (5% aqueous solution), and
326.66 g (100.0 pphm) of methyl chloride quaternised dimethylaminoethylmethacrylate.

An oil phase is prepared by admixing together the following components:

8.0 g (2.45 pphm) of sorbitan tri-oleate (75% in dearomatized aliphatic hydrocarbon) point between 160° C. till 190° C.
67.8 g (5.22 pphm) of a polymeric stabilizer (stearyl methacrylate-methacrylic acid copolymer: (18.87% in solvent)
151.29 g (61.75 pphm) of 2-ethylhexyl stearate, and
60.2 g (24.57 pphm) of dearomatised hydrocarbon solvent with a boiling point between 160° C. and 190° C.

The two phases are mixed together in a ratio of 41.8 parts oil phase to 58.2 parts aqueous phase under high shear to form a water-in-oil emulsion. The resulting water-in-oil emulsion is transferred to a reactor equipped with nitrogen sparge tube, stirrer and thermometer. The emulsion is purged with nitrogen to remove oxygen.

Polymerisation is effected by addition of a redox couple of sodium metabisulphite and tertiary butyl hydroperoxide stepwise such that is a temperature increase of 2° C./min.

Once the isotherm has been attained, a free radical initiator (2,2'-azobis(2-methylbutyronitrile), CAS: 13472-08-7) is added in two steps (the 2nd step after 45 min) and the emulsion is kept at 85° C. for 75 minutes.

Vacuum distillation is carried out to remove water and volatile solvent to give a final product of 50% polymer solids.

To this product addition is made of 34.3 g (14.0 pphm) of a fatty alcohol alkoxylate [alcohol C6-C17(secondary) poly (3-6)ethoxylate: 97% secondary alcohol ethoxylate+3% poly(ethylene oxide)], (CAS No. 84133-50-6).

Comparative Example 2 (CE2)

Synthesis of the Cationic Polymer

This example illustrates the preparation of a suitable cationic polymer.

An aqueous phase of water soluble components is prepared by admixing together the following components:

1.88 g (0.5 pphm) of citric acid-1-hydrate,
1.07 g 0.29 pphm) of a aqueous solution of pentasodium diethylenetriaminepentaacetate,
220.37 g (58.77 pphm) of water,
3.75 g (0.01 pphm) of methylene-bis-acrylamide (1% aqueous solution),
0.75 g (0.2 pphm) of formic acid
281.25 g (60.0 pphm) of methyl chloride quaternised dimethylaminoethylacrylate (DMA3*MeCl 80% aqueous solution), and
300.00 g (40.0 pphm) of acrylamide (50% aqueous solution).

An oil phase is prepared by admixing together the following components:

12.245 g (2.45 pphm) of sorbitan tri-oleate (75% in dearomatized aliphatic hydrocarbon) point between 160° C. till 190° C.

103.825 g (5.22 pphm) of a polymeric stabiliser, stearyl methacrylate-methacrylic acid copolymer (18.87% in solvent)

259.14 g (69.1 pphm) of 2-ethylhexyl stearate, and 99.97 g (26.66 pphm) of dearomatised hydrocarbon solvent with a boiling point between 160° C. and 190° C.

The two phases are mixed together in a ratio of 37 parts oil phase to 63 parts aqueous phase under high shear to form a water-in-oil emulsion. The resulting water-in-oil emulsion is transferred to a reactor equipped with nitrogen sparge tube, stirrer and thermometer. 0.21 g (0.056 pphm) 2,2-Azobis(2-methylbutyronitril) is added and the emulsion is purged with nitrogen to remove oxygen.

Polymerisation is effected by addition of a redox couple of sodium metabisulphite and tertiary butyl hydroperoxide stepwise such that is a temperature increase of 2° C./min. After the isotherm is completed the emulsion held at 85° C. for 60 minutes. Then residual monomer reduction with 72.7 g (0.25 pphm) tertiary butyl hydroperoxide (1.29% in solvent) and 82.2 g (0.25 pphm) sodium metabisulphite (1.14% in emulsion) is started (3 hours feeding time).

Vacuum distillation is carried out to remove water and volatile solvent to give a final product, i.e. a dispersion containing 50% polymer solids.

To this product addition is made of 52.5 g (14.0 pphm) of a fatty alcohol alkoxylate [alcohol C6-C17(secondary) poly (3-6)ethoxylate: 97% secondary alcohol ethoxylate+3% poly(ethylene oxide)], (CAS No. 84133-50-6).

Comparative Example 3 (CE3)

An aqueous phase of water soluble components is prepared by admixing together the following components:

2.26 g (0.5 pphm) of citric acid-1-hydrate, 2.25 g (0.2 pphm) of a aqueous solution (40%) of pentasodium diethylenetriaminepentaacetate, 170.55 g (37.90 pphm) of water, 9.00 g (0.10 pphm) of tetraallylammonium chloride (TAAC) (5% aqueous solution)-0.90 g (0.2 pphm) of formic acid 337.5 g (60.0 pphm) of methyl chloride quaternised dimethylaminoethylacrylate (DMA3*MeCl 80% aqueous solution), and 360.00 g (40.0 pphm) of acrylamide (50% aqueous solution).

An oil phase is prepared by admixing together the following components:

73.47 g (2.45 pphm) of stabilizing agent B (15% in solvent) as stabilizing surfactant, 124.58 g (5.22 pphm) of a polymeric stabiliser stearyl methacrylate-methacrylic acid copolymer (18.87% in solvent), 354.15 g (78.7 pphm) of 2-ethylhexyl stearate, and 111.65 g (24.81 pphm) of dearomatised hydrocarbon solvent with a boiling point between 160° C. till 190° C.

The two phases are mixed together in a ratio of 43 parts oil phase to 57 parts aqueous phase under high shear to form a water-in-oil emulsion. The resulting water-in-oil emulsion is transferred to a reactor equipped with nitrogen sparge tube, stirrer and thermometer. 0.11 g (0.025 pphm) 2,2-Azobis(2-methylbutyronitril) is added and the emulsion is purged with nitrogen to remove oxygen.

Polymerisation is effected by addition of a redox couple of sodium metabisulphite and tertiary butyl hydroperoxide (one shot: 2.25 g (1% in solvent/0.005 pphm) stepwise such that is a temperature increase of 1.5° C./min. After the isotherm is completed the emulsion held at 85° C. for 60 minutes. Then residual monomer reduction with 18.25 g (0.25 pphm) tertiary butyl hydroperoxide (6.16% in solvent) and 21.56 g (0.25 pphm) sodium metabisulphite (5.22% in emulsion) is started (1.5 hours feeding time).

Vacuum distillation is carried out to remove water and volatile solvent to give a final product, i.e. a dispersion containing 50% polymer solids.

To this product addition is made of 63.0 g (14.0 pphm) of a fatty alcohol alkoxylate [alcohol C6-C17(secondary) poly (3-6)ethoxylate: 97% secondary alcohol ethoxylate+3% poly(ethylene oxide)], (CAS No. 84133-50-6).

Comparative Example 4 (CE4)

An aqueous phase of water soluble components is prepared by admixing together the following components:

2.26 g (0.5 pphm) of citric acid-1-hydrate, 2.25 g (0.2 pphm) of a aqueous solution (40%) of pentasodium diethylenetriaminepentaacetate, 170.55 g (37.90 pphm) of water, 9.00 g (0.10 pphm) of Trimethylolpropane tris(polyethylene glycol ether) triacrylate (TMPTA EOx) (5% aqueous solution)

0.90 g (0.2 pphm) of formic acid 337.50 g (60.0 pphm) of methyl chloride quaternised dimethylaminoethylacrylate (DMA3*MeCl 80% aqueous solution), and 360.00 g (40.0 pphm) of acrylamide (50% aqueous solution).

An oil phase is prepared by admixing together the following components:

73.47 g (2.45 pphm) of stabilizing agent B (15% in solvent) as stabilizing surfactant, 124.58 g (5.22 pphm) of a polymeric stabiliser stearyl methacrylate-methacrylic acid copolymer (18.87% in solvent), 354.15 g (78.7 pphm) of 2-ethylhexyl stearate, and 111.65 g (24.81 pphm) of dearomatised hydrocarbon solvent with a boiling point between 160° C. till 190° C.

The two phases are mixed together in a ratio of 43 parts oil phase to 57 parts aqueous phase under high shear to form a water-in-oil emulsion. The resulting water-in-oil emulsion is transferred to a reactor equipped with nitrogen sparge tube, stirrer and thermometer. 0.11 g (0.025 pphm) 2,2-Azobis(2-methylbutyronitril) is added and the emulsion is purged with nitrogen to remove oxygen.

Polymerisation is effected by addition of a redox couple of sodium metabisulphite and tertiary butyl hydroperoxide (one shot: 2.25 g (1% in solvent/0.005 pphm) stepwise such that is a temperature increase of 1.5° C./min. After the isotherm is completed the emulsion held at 85° C. for 60 minutes. Then residual monomer reduction with 18.25 g (0.25 pphm) tertiary butyl hydroperoxide (6.16% in solvent) and 21.56 g (0.25 pphm) sodium metabisulphite (5.22% in emulsion) is started (1.5 hours feeding time).

Vacuum distillation is carried out to remove water and volatile solvent to give a final product, i.e. a dispersion containing 50% polymer solids.

To this product addition is made of 63.0 g (14.0 pphm) of a fatty alcohol alkoxylate [alcohol C6-C17(secondary) poly (3-6)ethoxylate: 97% secondary alcohol ethoxylate+3% poly(ethylene oxide)], (CAS No. 84133-50-6).

Example 1

Synthesis of the Cationic Polymer

An aqueous phase (1) of water soluble components is prepared by admixing together the following components:

1.41 g (0.31 pphm) of citric acid-1-hydrate, 1.34 g (0.12 pphm) of a 40% aqueous solution of pentasodium diethylenetriaminepentaacetate, 135.71 g (30.16 pphm) of water, 210.94 g (37.5 pphm) of methyl chloride quaternised dimethylaminoethylacrylate (80% aqueous solution), 225.00 g (25.0 pphm) of acrylamide (50% aqueous solution), 3.55 g (0.0394 pphm) of pentaerythrityl tri/tetraacrylate (5% solution in propylene glycol)

An oil phase (1) is prepared by admixing together the following components:

45.90 g (1.53 pphm) of PEG 30 dipolyhydroxystearate, Dehymuls LE, (15% in solvent).

77.89 g (3.27 pphm) of a polymeric stabilizer (stearyl methacrylate-methacrylic acid copolymer: (18.87% in solvent)

210.71 g (46.83 pphm) of 2-ethylhexyl stearate, and 50.76 g (11.28 pphm) of dearomatised hydrocarbon solvent with a boiling point between 160° C. till 190° C.

The two phases (1) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer. The emulsion is purged with nitrogen to remove oxygen.

Polymerisation is effected by addition of a redox couple of sodium metabisulphite and tertiary butyl hydroperoxide stepwise such that is a temperature increase of 1.5° C./min.

After max. temperature is reached 3.65 g (0.05 pphm) of tertiary butyl hydroperoxide (6.16% solution in solvent) and 4.31 g (0.05 pphm) of sodium metabisulphite (5.24% emulsion) are fed simultaneously for 15 min. (during feeding go to 85° C.).

0.90 g (0.2 pphm) of a free radical initiator (2,2'-azobis(2-methylbutyronitrile), CAS: 13472-08-7) was add into the reactor [with the polymerized aqueous/oil phase (1)] and stirred for 5 min. at 85° C.

Then the following mixture aqueous/oil phase (2) is fed continuously over 60 min.

An aqueous phase (2) of water soluble components is prepared by admixing together the following components:

0.86 g (0.19 pphm) of citric acid-1-hydrate, 0.80 g (0.07 pphm) of a 40% aqueous solution of pentasodium diethylenetriaminepentaacetate, 86.18 g (19.15 pphm) of water, 126.56 g (22.5 pphm) of methyl chloride quaternised dimethylaminoethylacrylate (80% aqueous solution), 135.00 g (15.0 pphm) of acrylamide (50% aqueous solution), 3.57 g (0.675 pphm) of formic acid (85% aqueous solution)

An oil phase (2) is prepared by admixing together the following components:

55.20 g (1.84 pphm) of PEG 30 dipolyhydroxystearate, Dehymuls LE, (15% in solvent).

48.51 g (2.03 pphm) of a polymeric stabilizer (stearyl methacrylate-methacrylic acid copolymer: (18.87% in solvent)

130.59 g (29.02 pphm) of 2-ethylhexyl stearate, and 6.98 g (1.55 pphm) of dearomatised hydrocarbon solvent with a boiling point between 160° C. and 190° C.

The two phases (2) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer.

After feeding mixture of aqueous/oil phase (2) hold for 30 min. at 85° C.

Then are fed 14.62 g (0.2 pphm) of tertiary butyl hydroperoxide (6.16% solution in solvent) and 17.25 g (0.2 pphm) of sodium metabisulphite (5.24% emulsion) are fed simultaneously for 90 min. (chem. deso.)

After chemical desodoration (chem. deso.), a free radical initiator (2,2'-azobis(2-methylbutyronitrile), CAS: 13472-08-7) is added in one step and the emulsion is kept at 85° C. for 60 minutes.

Vacuum distillation is carried out to remove water and volatile solvent to give a final product of 50% polymer solids.

To this product addition is made of 63.00 g (14.0 pphm) of a fatty alcohol alkoxylate [alcohol $C_6$-$C_{17}$(secondary) poly(3-6)ethoxylate: 97% secondary alcohol ethoxylate+3% poly(ethylene oxide)], (CAS No. 84133-50-6) and 27.00 g (1.5 pphm) of citric acid (25% aqueous solution).

Examples 1.1., 5.1., 5.2, 5.3, 9.1, 11.1, 13.1, 15.1, 17.1, 19.1, in Table 1 are prepared according to the same process as the one described above for Example 1.

Example 2

Synthesis of the Cationic Polymer

An aqueous phase (1) of water soluble components is prepared by admixing together the following components:

1.13 g (0.25 pphm) of citric acid-1-hydrate, 1.07 g (0.095 pphm) of a 40% aqueous solution of pentasodium diethylenetriaminepentaacetate, 108.25 g (24.06 pphm) of water, 168.75 g (30.0 pphm) of methyl chloride quaternised dimethylaminoethylacrylate (80% aqueous solution), 180.00 g (20.0 pphm) of acrylamide (50% aqueous solution), 3.55 g (0.0394 pphm) of pentaerythrityl tri/tetraacrylate (5% solution in propylene glycol)

An oil phase (1) is prepared by admixing together the following components:

36.75 g (1.23 pphm) of PEG 30 dipolyhydroxystearate, Dehymuls LE, (15% in solvent).

62.24 g (2.61 pphm) of a polymeric stabilizer (stearyl methacrylate-methacrylic acid copolymer: (18.87% in solvent)

168.57 g (37.46 pphm) of 2-ethylhexyl stearate, and 40.61 g (9.03 pphm) of dearomatised hydrocarbon solvent with a boiling point between 160° C. till 190° C.

The two phases (1) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer. The emulsion is purged with nitrogen to remove oxygen.

Polymerisation is effected by addition of a redox couple of sodium metabisulphite and tertiary butyl hydroperoxide stepwise such that is a temperature increase of 1.5° C./min.

After max. temperature is reached 3.65 g (0.05 pphm) of tertiary butyl hydroperoxide (6.16% solution in solvent) and 4.31 g (0.05 pphm) of sodium metabisulphite (5.24% emulsion) are fed simultaneously for 15 min. (during feeding go to 85° C.).

0.90 g (0.20 pphm) of a free radical initiator (2,2'-azobis(2-methylbutyronitrile), CAS: 13472-08-7) was add into the reactor [with the polymerized aqueous/oil phase (1)] and stirred for 5 min. at 85° C.

Then the following mixture aqueous/oil phase (2) is fed continuously over 90 min.

An aqueous phase (2) of water soluble components is prepared by admixing together the following components:

1.13 g (0.25 pphm) of citric acid-1-hydrate,
1.07 g (0.095 pphm) of a 40% aqueous solution of pentasodium diethylenetriaminepentaacetate,
109.17 g (24.26 pphm) of water,
168.75 g (30.0 pphm) of methyl chloride quaternised dimethylaminoethylacrylate (80% aqueous solution),
180.00 g (20.0 pphm) of acrylamide (50% aqueous solution),
4.76 g (0.90 pphm) of formic acid (85% aqueous solution)

An oil phase (2) is prepared by admixing together the following components:

73.50 g (2.45 pphm) of PEG 30 dipolyhydroxystearate, Dehymuls LE, (15% in solvent).
62.24 g (2.61 pphm) of a polymeric stabilizer (stearyl methacrylate-methacrylic acid copolymer: (18.87% in solvent)
174.08 g (38.69 pphm) of 2-ethylhexyl stearate, and
0.05 g (0.01 pphm) of dearomatised hydrocarbon solvent with a boiling point between 160° C. till 190° C.

The two phases (2) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer.

After feeding mixture of aqueous/oil phase (2) hold for 30 min. at 85° C.

Then 14.62 g (0.2 pphm) of tertiary butyl hydroperoxide (6.16% solution in solvent) and 17.25 g (0.2 pphm) of sodium metabisulphite (5.24% emulsion) are fed simultaneously for 90 min. (chem. deso.).

After chem. deso. a free radical initiator (2,2'-azobis(2-methylbutyronitrile), CAS: 13472-08-7) is added in one step and the emulsion is kept at 85° C. for 60 minutes. Vacuum distillation is carried out to remove water and volatile solvent to give a final product of 50% polymer solids.

To this product addition is made of 63.00 g (14.0 pphm) of a fatty alcohol alkoxylate [alcohol $C_6$-$C_{17}$(secondary) poly(3-6)ethoxylate: 97% secondary alcohol ethoxylate+3% poly(ethylene oxide)], (CAS No. 84133-50-6) and 27.00 g (1.5 pphm) of citric acid (25% aqueous solution).

Example 3

Synthesis of the Cationic Polymer

An aqueous phase (1) of water soluble components is prepared by admixing together the following components:

0.20 g (0.05 pphm) of citric acid-1-hydrate,
0.19 g (0.02 pphm) of a 40% aqueous solution of pentasodium diethylenetriaminepentaacetate,
28.21 g (7.05 pphm) of water,
30.00 g (6.00 pphm) of methyl chloride quaternised dimethylaminoethylacrylate (80% aqueous solution),
32.00 g (4.0 pphm) of acrylamide (50% aqueous solution),
3.15 g (0.0394 pphm) of pentaerythrityl tri/tetraacrylate (5% solution in propylene glycol)

An oil phase (1) is prepared by admixing together the following components:

6.53 g (0.25 pphm) of PEG 30 dipolyhydroxystearate (15% in solvent).
11.02 g (0.52 pphm) of a polymeric stabilizer (stearyl methacrylate-methacrylic acid copolymer: (18.87% in solvent)
29.96 g (7.49 pphm) of 2-ethylhexyl stearate, and
14.72 g (3.68 pphm) of dearomatised hydrocarbon solvent with a boiling point between 160° C. and 190° C.

The two phases (1) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer. The emulsion is purged with nitrogen to remove oxygen.

Polymerisation is effected by addition of a redox couple of sodium metabisulphite and tertiary butyl hydroperoxide stepwise such that is a temperature increase of 1.5° C./min.

After max. temperature is reached 3.25 g (0.05 pphm) of tertiary butyl hydroperoxide (6.16% solution in solvent) and 3.83 g (0.05 pphm) of sodium metabisulphite (5.24% emulsion) are fed simultaneously for 15 min. (during feeding go to 85° C.).

1.80 g (0.45 pphm) of a free radical initiator (2,2'-azobis (2-methylbutyronitrile), CAS: 13472-08-7) was add into the reactor [with the polymerized aqueous/oil phase (1)] and stirred for 5 min. at 85° C.

Then the following mixture aqueous/oil phase (2) is fed continuously over 120 min.

An aqueous phase (2) of water soluble components is prepared by admixing together the following components:

1.80 g (0.45 pphm) of citric acid-1-hydrate,
1.70 g (0.17 pphm) of a 40% aqueous solution of pentasodium diethylenetriaminepentaacetate,
274.44 g (68.61 pphm) of water,
270.00 g (54.0 pphm) of methyl chloride quaternised dimethylaminoethylacrylate (80% aqueous solution),
288.00 g (36.0 pphm) of acrylamide (50% aqueous solution),
7.62 g (1.62 pphm) of formic acid (85% aqueous solution)

An oil phase (2) is prepared by admixing together the following components:

117.60 g (4.41 pphm) of PEG 30 dipolyhydroxystearate (15% in solvent).
99.63 g (4.7 pphm) of a polymeric stabilizer (stearyl methacrylate-methacrylic acid copolymer: (18.87% in solvent)
269.72 g (67.43 pphm) of 2-ethylhexyl stearate, and
74.64 g (18.66 pphm) of dearomatised hydrocarbon solvent with a boiling point between 160° C. and 190° C.

The two phases (2) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer.

After feeding mixture of aqueous/oil phase (2) hold for 30 min. at 85° C.

Then 12.99 g (0.2 pphm) of tertiary butyl hydroperoxide (6.16% solution in solvent) and 15.33 g (0.2 pphm) of sodium metabisulphite (5.24% emulsion) are fed simultaneously for 90 min. (chem. deso.).

After chem. deso. a free radical initiator (2,2'-azobis(2-methylbutyronitrile), CAS: 13472-08-7) is added in one step and the emulsion is kept at 85° C. for 60 minutes.

Vacuum distillation is carried out to remove water and volatile solvent to give a final product of 50% polymer solids.

To this product addition is made of 56.00 g (14.0 pphm) of a fatty alcohol alkoxylate [alcohol $C_6$-$C_{17}$(secondary) poly(3-6)ethoxylate: 97% secondary alcohol ethoxylate+3% poly(ethylene oxide)], (CAS No. 84133-50-6) and 24.00 g (1.5 pphm) of citric acid (25% aqueous solution).

Example 4

Synthesis of the Cationic Polymer

An aqueous phase (1) of water soluble components is prepared by admixing together the following components:
1.13 g (0.25 pphm) of citric acid-1-hydrate,
1.07 g (0.095 pphm) of a 40% aqueous solution of pentasodium diethylenetriaminepentaacetate,
108.25 g (24.06 pphm) of water,
168.75 g (30.0 pphm) of methyl chloride quaternised dimethylaminoethylacrylate (80% aqueous solution),
180.00 g (20.0 pphm) of acrylamide (50% aqueous solution),
3.55 g (0.0394 pphm) of pentaerythrityl tri/tetraacrylate (5% solution in propylene glycol)

An oil phase (1) is prepared by admixing together the following components:
36.75 g (1.23 pphm) of PEG 30 dipolyhydroxystearate (15% in solvent).
62.24 g (2.61 pphm) of a polymeric stabilizer (stearyl methacrylate-methacrylic acid copolymer: (18.87% in solvent)
168.57 g (37.46 pphm) of 2-ethylhexyl stearate, and
40.61 g (9.03 pphm) of dearomatised hydrocarbon solvent with a boiling point between 160° C. till 190° C.

The two phases (1) are mixed together in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer. The emulsion is purged with nitrogen to remove oxygen.

Polymerisation is effected by addition of a redox couple of sodium metabisulphite and tertiary butyl hydroperoxide stepwise such that a temperature increase of 1.5° C./min.

After max. temperature is reached 3.65 g (0.05 pphm) of tertiary butyl hydroperoxide (6.16% solution in solvent) and 4.31 g (0.05 pphm) of sodium metabisulphite (5.24% emulsion) are fed simultaneously for 15 min. (during feeding go to 85° C.).

Then the following mixture aqueous/oil phase (2) is added into the reactor and stirred for 30 min., during this time go 85° C.

An aqueous phase (2) of water soluble components is prepared by admixing together the following components:
1.13 g (0.25 pphm) of citric acid-1-hydrate,
1.07 g (0.095 pphm) of a 40% aqueous solution of pentasodium diethylenetriaminepentaacetate,
109.17 g (24.26 pphm) of water,
168.75 g (30.0 pphm) of methyl chloride quaternised dimethylaminoethylacrylate (80% aqueous solution),
180.00 g (20.0 pphm) of acrylamide (50% aqueous solution),
4.76 g (0.90 pphm) of formic acid (85% aqueous solution)

An oil phase (2) is prepared by admixing together the following components:
73.50 g (2.45 pphm) of PEG 30 dipolyhydroxystearate (15% in solvent).
62.24 g (2.61 pphm) of a polymeric stabilizer (stearyl methacrylate-methacrylic acid copolymer: (18.87% in solvent)
174.08 g (38.69 pphm) of 2-ethylhexyl stearate, and
0.05 g (0.01 pphm) of dearomatised hydrocarbon solvent with a boiling point between 160° C. till 190° C.

The two phases (2) are mixed together (batch mode) in a ratio of 40 parts oil phase to 60 parts aqueous phase under high shear to form a water-in-oil emulsion. The resulting water-in-oil emulsion is transferred to a reactor equipped with nitrogen sparge tube, stirrer and thermometer.

After adding the mixture of aqueous/oil phase (2) into the reactor and stirring for 30 min., 14.62 g (0.2 pphm) of tertiary butyl hydroperoxide (6.16% solution in solvent) and 17.25 g (0.2 pphm) of sodium metabisulphite (5.24% emulsion) are fed simultaneously for 120 min. (polym./chem. deso.).

After polym./chem. deso. 0.11 g (0.025 pphm) of a free radical initiator (2,2'-azobis(2-methylbutyronitrile), CAS: 13472-08-7) is added in one step and the emulsion is kept at 85° C. for 60 minutes.

Vacuum distillation is carried out to remove water and volatile solvent to give a final product of 50% polymer solids.

To this product addition is made of 63.00 g (14.0 pphm) of a fatty alcohol alkoxylate [alcohol $C_6$-$C_{17}$(secondary) poly(3-6)ethoxylate: 97% secondary alcohol ethoxylate+3% poly(ethylene oxide)], (CAS No. 84133-50-6) and 27.00 g (1.5 pphm) of citric acid (25% aqueous solution).

Examples 6.1., 6.2, 7.1, 8.1, 10.1, 12.1, 14.1, 16.1, 18.1 in Table 1 are prepared according to the same process as the one described above for Example 4.

TABLE 1

Overview of all Examples

| Example | Weight % ratio step I/ step II | PETIA ppm/ polymer | Formic acid %/ polymer | Sodium hypo- phosphite %/ polymer | Dehymuls LE %/ polymer | Wako V 59%/ polymer | Process conditions for water- soluble polymer components |
|---------|---|---|---|---|---|---|---|
| CE1 | 100:0 | MBA 1200 | | 0.020 | Sorbitan Trioleate 2.45 | | |
| CE2 | 100:0 | MBA 100 | 0.200 | | Sorbitan Trioleate 2.45 | | |
| CE3 | 100:0 | TAAC 1000 | 0.200 | | 2.45 | | |
| CE4 | 100:0 | TMPTA 1000 | 0.200 | | 2.45 | | |
| 1 | 62.5:37.5 | 394 | 0.675 | | 3.37 | 0.20 | continuous feed |
| 1.1 | 62.5:37.5 | 394 | 0.675 | | 2.45 | 0.20 | continuous feed |
| 2 | 50:50 | 394 | 0.900 | | 3.68 | 0.2 | continuous feed |
| 3 | 10:90 | 394 | 1.620 | | 4.66 | 0.45 | continuous feed |
| 4 | 50:50 | 394 | 0.900 | | 3.68 | | batch |
| 5.1 | 70:30 | 394 | 0.540 | | 3.20 | 0.20 | continuous feed |
| 5.2 | 70:30 | 394 | | 0.022 | 3.19 | 0.20 | continuous feed |
| 5.3 | 70:30 | 394 | | 0.0241 | 3.19 | 0.20 | continuous feed |

TABLE 1-continued

Overview of all Examples

| Example | Weight % ratio step I/ step II | PETIA ppm/ polymer | Formic acid %/ polymer | Sodium hypo-phosphite %/ polymer | Dehymuls LE %/ polymer | Wako V 59%/ polymer | Process conditions for water-soluble polymer components |
|---|---|---|---|---|---|---|---|
| 6.1 | 70:30 | 394 | 0.540 | | 3.20 | | batch |
| 6.2 | 70:30 | 394 | | 0.0241 | 3.19 | | batch |
| 7.1 | 70:30 | 394 | | 0.022 | 3.19 | | batch |
| 8.1 | 62.5:37.5 | 394 | 0.675 | | 2.457 | | batch |
| 9.1 | 56:44 | 394 | 0.988 | | 3.53 | 0.22 | contineous feed |
| 10.1 | 56:44 | 394 | 0.988 | | 3.53 | | batch |
| 11.1 | 39.5:60.5 | 394 | 1.287 | | 3.94 | 0.27 | contineous feed |
| 12.1 | 39.5:60.5 | 394 | 1.287 | | 3.94 | | batch |
| 13.1 | 39.5:60.5 | 394 | | 0.0515 | 3.94 | 0.27 | contineous feed |
| 14.1 | 39.5:60.5 | 394 | | 0.0515 | 3.94 | | batch |
| 15.1 | 56:44 | 94 | | 0.086 | 3.53 | 0.22 | contineous feed |
| 16.1 | 56:44 | 394 | | 0.086 | 3.53 | | batch |
| 17.1 | 90:10 | 394 | | | 2.70 | 0.05 | contineous feed |
| 18.1 | 90:10 | 394 | | | 2.70 | | batch |
| 19.1 | 70:30 | 394 | 0.540 | | 3.19 | | contineous feed |

TABLE 2

Characterisation of examples from table 1

| Example | Solid Content (%) | Viscosity (mPa*s) of 1% product in deionized water measured after 30 min at room temperature | Sedimentation Coefficient for water-soluble polymer component P1 (Sved 50) | Sedimentation Coefficient for water-soluble polymer component P1.1 (Sved Peak) | Sedimentation Coefficient for water-soluble polymer component P1.2 (Sved Peak) | Wt % for water-polymer component (%) | Molecular weight for water-soluble polymer component P1.1 (g/mol) | Molecular weight for water-soluble polymer component P1.2 (g/mol) | Sedimentation Coefficient for insoluble polymer component P2 (Sved) | Wt % for insoluble polymer component P2 (%) | Viscosity slope |
|---|---|---|---|---|---|---|---|---|---|---|---|
| CE1 | | 24000 | 5.7 | No peak | | 9 | No peak | >400.000 | 25000 | 91 | 5.9 |
| CE2 | | 14300 | 7.0 | No peak | | 20 | No peak | >400.000 | 8400 | 80 | 5.1 |
| CE3 | | 9280 | 6.1 | No peak | | 22 | No peak | >400.000 | 18500 | 78 | 5.2 |
| CE4 | | 11460 | 4.7 | No peak | | 19 | No peak | >400.000 | 22100 | 81 | |
| 1 | 50.4 | 168 | 2.3 | 1.5 | 7.5 | 44 | 155.000 | 560.000 | 22200 | 56 | |
| 1.1 | 50.2 | 168 | 2.7 | 1.7 | 3.7 | 46 | 130.000 | 540.000 | 60900 | 54 | |
| 2 | 50.5 | 60 | 3.7 | 2.0 | 4.6; 8.3 | 58 | 140.000 | 480.000 | 54300 | 42 | |
| 3 | 49.6 | 16 | 2.8 | 2.7 | 4.3 | 94 | 160.000 | | 62800 | 6 | |
| 4 | 49.9 | 120 | 4.7 | 2.7 | 4.5; 5.9 | 56 | | 1.100.000 | 50500 | 44 | |
| 5.1 | 50.5 | 436 | 2.9 | 1.5 | 3.6 | 45 | 220.000 | 700.000 | 25000 | 55 | |
| 5.2 | 50.0 | 924 | 4.5 | 2.7 | 4.6; 6.6 | 42 | 140.000 | 1.800.000 | 23900 | 58 | |
| 5.3 | 49.9 | 608 | 4.6 | 2.8 | 4.7; 6.7 | 46 | 130.000 | 1.700.000 | 24200 | 54 | |
| 6.1 | 50.7 | 376 | 5.4 | 2.1 | 4.6; 8.3 | 39 | 200.000 | 1.200.000 | 25500 | 61 | |
| 6.2 | 49.7 | 828 | | | | | | | | | |
| 7.1 | 47.2 | 112 | | | | | | | | | |
| 8.1 | 50.0 | 120 | 2.6 | 1.5 | 3.9 | 49 | 75.000 | 800.000 | 59000 | 51 | |
| 9.1 | 49.7 | 152 | | | | | | | | | |
| 10.1 | 48.7 | 240 | | | | | | | | | |
| 11.1 | 50.0 | 40 | | | | | | | | | |
| 12.1 | 49.8 | 128 | | | | | | | | | |
| 13.1 | 50.5 | 40 | | | | | | | | | |
| 14.1 | 50.6 | 68 | | | | | | | | | |
| 15.1 | 50.6 | 140 | | | | | | | | | |
| 16.1 | 50.9 | 172 | | | | | | | | | |
| 17.1 | 50.7 | 8280 | | | | | | | | | |
| 18.1 | 49.9 | 3440 | | | | | | | | | |
| 19.1 | | | | | | | | | | | |

The invention claimed is:

1. A process for obtaining a cationic polymer by polymerization of
a) at least one cationic monomer and at least one nonionic monomer (monomer component a), wherein
the cationic monomer according to monomer component a) in the cationic polymer is selected from a compound of the formula (II)

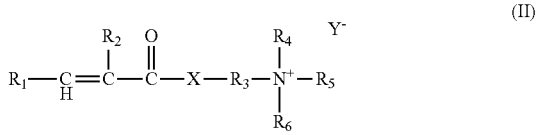

where
$R_1$ is H or $C_1$-$C_4$-alkyl,
$R_2$ is H or methyl,
$R_3$ is $C_1$-$C_4$-alkylene,
$R_4$, $R_5$ and $R_6$ are each independently H or $C_1$-$C_{30}$-alkyl,
X is —O— or —NH— and
Y is Cl; Br; I; hydrogensulfate or methosulfate,
wherein monomer component a) in the cationic polymer comprises 30 to 99.5% by weight of at least one cationic monomer and 0.5 to 70% by weight of at least one nonionic monomer,
b) at least one crosslinker (monomer component b),
c) optionally at least one chain transfer agent (monomer component c),
wherein the cationic polymer has an at least bimodal molecular weight distribution with at least one first peak (P1) with an average sedimentation coefficient of ≤100 Sved and with at least one second peak (P2) with an average sedimentation coefficient of ≥1000 Sved, and
wherein the polymerization is carried out in two steps I) and II) with:
I) polymerization of monomer component a) and monomer component b),
II) polymerization of monomer component a), optionally monomer component c) and in a complete absence or in a presence of <10 ppm (related to a total amount of cationic polymer) of monomer component b),
wherein step II) is carried out after the polymerization of step I) is finished or step I) is carried out after the polymerization of step II) is finished.

2. The process according to claim 1, wherein
i) the nonionic monomer according to monomer component a) in the cationic polymer is selected from N-vinylpyrrolidone, N-vinylimidazole or a compound of the formula (III)

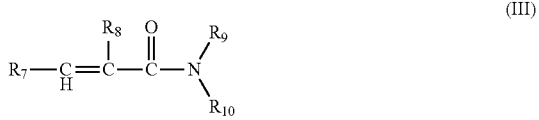

where
$R_7$ is H or $C_1$-$C_4$-alkyl,
$R_8$ is H or methyl, and
$R_9$ and $R_{10}$ are each independently H or $C_1$-$C_{30}$-alkyl, and/or ii) the crosslinker (monomer component b) in the cationic polymer is selected from
divinylbenzene; tetraallylammonium chloride; allyl acrylates; allyl methacrylates; diacrylates and dimethacrylates of glycols or polyglycols; butadiene; 1,7-octadiene; allylacrylamides or allylmethacrylamides; bisacrylamidoacetic acid; N,N'-methylenebisacrylamide; polyol polyallyl ethers such as polyallyl sucrose or pentaerythritol triallyl ether; pentaerythrityl triacrylate; pentaerythrityl tetraacrylate; 1,1,1-trimethylolpropane tri(meth)acrylate; the ethoxylated compounds thereof or a mixture thereof, and/or iii) the chain transfer agent (monomer component c) in the cationic polymer is selected from mercaptans, lactic acid, formic acid, isopropanol or hypophosphites.

3. The process according to claim 1, wherein the monomer component a) contains at least one cationic monomer and at least one nonionic monomer.

4. The process according to claim 1, wherein the polymerization is an emulsion polymerization, and/or steps I) and II) are carried out in the same polymerization vessel.

5. The process according to claim 1, wherein
i) the at least one first peak (P1) is splitted into at least two peaks and a weight average sum of said peaks has a sedimentation coefficient of ≤50 Sved, and/or
ii) the at least one first peak (P1) is not splitted into more than one peak and the at least one first peak (P1) has an average sedimentation coefficient of ≤50 Sved, and/or
iii) the at least one second peak (P2) has an average sedimentation coefficient of ≥10,000 Sved, and/or
iv) the cationic polymer has an at least trimodal molecular weight distribution.

6. The process according to claim 1, wherein the at least one first peak (P1) is splitted into at least two peaks wherein
i) a lower molecular weight peak (P1.1) has a weight average peak maximum of ≤1,000,000 g/mol, and a higher molecular weight peak (P1.2) has a weight average peak maximum of ≥1,000,000 g/mol, and/or
ii) the lower molecular weight peak (P1.1) has an average sedimentation coefficient of ≤Sved, and the higher molecular weight peak (P1.2) has an average sedimentation coefficient of >10 Sved.

7. The process according to claim 1, wherein the polymer is obtainable by additional polymerization of
d) at least one associative monomer (monomer component d),
the at least one associative monomer according to monomer component d) in the cationic polymer is selected from the group consisting of a compound of the formula (I)

R—O—(CH$_2$—CHR'—O)$_n$—CO—CR''=CH$_2$ (I)

where
R is $C_6$-$C_{50}$-alkyl,
R' is H or $C_1$-$C_4$-alkyl,
R'' is H or methyl,
n is an integer from 0 to 100.

8. The process according to claim 1, wherein water-soluble polymer components of the cationic polymer are between 5 to 95% by weight, related to the total amount of cationic polymer.

9. The process according to claim 8, wherein in step II) ≥5%, by weight of the water-soluble polymer components of the cationic polymer are produced related to the total amount of cationic polymer.

10. The process according to claim 7, wherein
i) step II) is carried out after the polymerization of step I) is finished, and/or
ii) step II) is carried out by polymerization of monomer component a), monomer component c) and optionally monomer component d), and/or
iii) monomer component b) is completely absent during the polymerization according to step II), and/or
iv) step I) is carried out by polymerization of monomer component a), 10 to 10,000 ppm, (related to the total amount of cationic polymer) of monomer component b) and optionally monomer component c), and/or
v) in step II), 5 to 95% by weight of water-soluble polymer components of the cationic polymer are produced related to the total amount of cationic polymer.

11. The process according to claim 1, wherein
i) in both steps I) and II), an aqueous phase and an oil phase are employed, and/or
ii) the aqueous phase in step I) contains at least one cationic monomer, at least one crosslinker and optionally at least one nonionic monomer, and/or
iii) the oil phase in step I) and/or step II) contains at least one stabilizing agent, at least one first oil, at least one second oil and optionally at least one associative monomer, wherein the at least one first oil is selected from dearomatized aliphatic hydrocarbons or mineral oils of low viscosity and the at least one second oil is selected from 2-ethylhexyl stearate and hydroheated heavy naphtha, and/or
iv) the aqueous phase in step II) contains at least one cationic monomer, at least one nonionic monomer, and optionally at least one chain transfer agent, and/or
v) in step II), a mixture of the aqueous phase and the oil phase is completely added to a polymerization vessel (batch reaction) and afterwards at least one initiator is added continuously, and/or
vi) in step II), the mixture of the aqueous phase and the oil phase is continuously added to the polymerization vessel (continuous reaction) and the at least one initiator is added prior to said mixture or the at least one initiator is added continuously and in parallel to said mixture into the polymerization vessel.

12. The process according to claim 1, wherein
i) step I) is initiated at a lower temperature than a temperature of step II), and/or
ii) step I) is carried out at a temperature in the range of −5° C. to 40° C., and/or
iii) step II) is carried out at a temperature in the range of 70° C. to 120° C. and/or
iv) step I) is started at a temperature in the range of −5° C. to 40° C., and heated-up by exothermal polymerization under adiabatical conditions.

13. The process according to claim 1, wherein an inverse dispersion comprises the at least one cationic polymer.

14. The process according to claim 13, wherein the inverse dispersion comprises further:
at least one oil, at least one activator, at least one stabilizing agent, optionally at least one complexing agent and optionally additional additives.

15. The process according to claim 13, wherein the inverse dispersion is a water-in-oil emulsion.

16. The process according to claim 14, wherein the stabilizing agent has one or more hydrophobic chains with more than 30 carbon atoms, or the stabilizing agent has an ABA block structure based on polyhydroxystearic acid as A block and polyalkylene oxide as B block.

17. The process according to claim 4, wherein the inverse emulsion polymerization is followed by distillation by a liquid dispersion polymer technology.

18. The process according to claim 1, wherein monomer component a) in the cationic polymer comprises 60 to 90% by weight, of at least one cationic monomer and 10 to 40% by weight, of at least one nonionic monomer.

19. The process according to claim 4, wherein the polymerization is an inverse emulsion polymerization and/or steps I) and II) are carried out in the same polymerization vessel.

20. The process according to claim 12, wherein step I) is carried out at a constant temperature, and/or step II) is carried out at a constant temperature.

* * * * *